United States Patent
Linnell et al.

(10) Patent No.: US 9,993,924 B2
(45) Date of Patent: Jun. 12, 2018

(54) CLOSED-LOOP CONTROL SYSTEM FOR ROBOTIC OPERATION

(71) Applicant: Bot & Dolly, LLC, San Francisco, CA (US)

(72) Inventors: Jeffrey Linnell, Woodside, CA (US); Kendra Byrne, San Francisco, CA (US); Matthew Bitterman, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

(21) Appl. No.: 15/006,290

(22) Filed: Jan. 26, 2016

(65) Prior Publication Data
US 2016/0136815 A1 May 19, 2016

Related U.S. Application Data

(63) Continuation of application No. 14/333,335, filed on Jul. 16, 2014, now Pat. No. 9,278,449.
(Continued)

(51) Int. Cl.
| | | |
|---|---|---|
| *B25J 13/00* | (2006.01) | |
| *B25J 9/16* | (2006.01) | |
| *G05B 19/418* | (2006.01) | |

(52) U.S. Cl.
CPC ............ *B25J 9/1674* (2013.01); *B25J 9/163* (2013.01); *B25J 9/1671* (2013.01); *B25J 9/1676* (2013.01);
(Continued)

(58) Field of Classification Search
CPC ........ B25J 9/163; B25J 9/1697; B25J 9/1671; B25J 9/1676; B25J 19/02; B25J 9/1656;
(Continued)

(56) References Cited

U.S. PATENT DOCUMENTS

| 4,140,953 A | 2/1979 | Dunne |
|---|---|---|
| 4,420,812 A | 12/1983 | Ito |

(Continued)

FOREIGN PATENT DOCUMENTS

| JP | 1145804 | 10/2001 |
|---|---|---|
| WO | 2014/003864 | 1/2014 |

OTHER PUBLICATIONS

Bengtsson, K. et al., "Sequence Planning Using Multiple and Coordinated Sequences of Operations," IEEE Transactions on Automation Science and Engineering, 2012, pp. 308-319, vol. 9, No. 2.
(Continued)

*Primary Examiner* — Dalena Tran
(74) *Attorney, Agent, or Firm* — Fish & Richardson P.C.

(57) ABSTRACT

Example systems and methods may allow for closed-loop control of robotic operation. One example method includes receiving input data that identifies data sources to monitor and indicates adjustments to make in response to deviations by at least one of the data sources from at least one predicted state during subsequent execution of sequences of operations by robotic devices, receiving data streams from the data sources during execution of the sequences of operations by the robotic devices, identifying a deviation by one of the data sources from a predicted state for which the received input data indicates adjustments to the sequences of operations for the robotic devices, providing instructions to the robotic devices to execute the adjusted sequences of operations, and providing instructions to a second computing device to update a visual simulation of the robotic devices based on the adjusted sequences of operations.

19 Claims, 20 Drawing Sheets

Related U.S. Application Data

(60) Provisional application No. 62/001,517, filed on May 21, 2014.

(52) U.S. Cl.
CPC ...... B25J 9/1694 (2013.01); G05B 19/41865 (2013.01); *G05B 2219/31244* (2013.01); *G05B 2219/32351* (2013.01); *G05B 2219/33234* (2013.01); *G05B 2219/33243* (2013.01); *Y02P 90/20* (2015.11); *Y02P 90/26* (2015.11); *Y10S 901/02* (2013.01)

(58) Field of Classification Search
CPC ................. B25J 9/1666; G05B 19/427; G05B 19/41865; G05B 19/41885; G05B 2219/32351; G05B 2219/32342; G05B 2219/40475; Y10S 901/02; Y10S 901/01; Y10S 901/03; Y10S 901/28
USPC ......... 700/245, 95, 190, 184, 255, 259, 262; 717/104, 105; 901/1–3, 28
See application file for complete search history.

(56) References Cited

U.S. PATENT DOCUMENTS

| | | | |
|---|---|---|---|
| 4,860,428 A | 8/1989 | Brolund | |
| 5,631,825 A | 5/1997 | Van Weele et al. | |
| 5,798,627 A | 8/1998 | Gililand et al. | |
| 5,937,143 A | 8/1999 | Watanabe | |
| 5,949,683 A | 9/1999 | Akami | |
| 5,950,006 A | 9/1999 | Crater et al. | |
| 5,993,365 A | 11/1999 | Stagnitto | |
| 6,161,051 A | 12/2000 | Hafemann et al. | |
| 6,493,607 B1 * | 12/2002 | Bourne ................. | B25J 9/1666 414/744.3 |
| 6,522,949 B1 | 2/2003 | Ikeda | |
| 6,522,951 B2 | 2/2003 | Born et al. | |
| 6,718,533 B1 | 4/2004 | Schneider et al. | |
| 7,298,385 B2 | 11/2007 | Kazi et al. | |
| 7,542,918 B2 | 6/2009 | Rolleston Phillips | |
| 7,590,680 B2 | 9/2009 | Fernando et al. | |
| 7,890,194 B2 | 2/2011 | Pannese | |
| 7,945,348 B2 | 5/2011 | Pannese et al. | |
| 8,073,567 B2 | 12/2011 | Nishi et al. | |
| 8,082,769 B2 | 12/2011 | Butscher et al. | |
| 8,229,587 B2 | 7/2012 | Shieh et al. | |
| 8,483,881 B2 | 7/2013 | Ermakov et al. | |
| 8,614,559 B2 | 12/2013 | Kassow et al. | |
| 8,639,666 B2 | 1/2014 | Densham et al. | |
| 8,660,738 B2 | 2/2014 | Faivre et al. | |
| 8,670,855 B2 | 3/2014 | Eickhorst | |
| 2001/0004718 A1 | 6/2001 | Gilliland et al. | |
| 2005/0119791 A1 | 6/2005 | Nagashima | |
| 2005/0273200 A1 | 12/2005 | Hietmann et al. | |
| 2006/0145647 A1 | 7/2006 | Kitatsuji et al. | |
| 2006/0200254 A1 | 9/2006 | Krause | |
| 2006/0229761 A1 | 10/2006 | Kita | |
| 2006/0276934 A1 | 12/2006 | Nihei et al. | |
| 2008/0014058 A1 | 1/2008 | Hongkham et al. | |
| 2009/0112350 A1 | 4/2009 | Yuan et al. | |
| 2010/0312387 A1 | 12/2010 | Jang et al. | |
| 2010/0332017 A1 | 12/2010 | Stummer | |
| 2011/0190938 A1 | 8/2011 | Ekelund | |
| 2012/0072019 A1 | 3/2012 | Sanders et al. | |
| 2012/0188350 A1 | 7/2012 | Hammond et al. | |
| 2012/0215354 A1 | 8/2012 | Krasny et al. | |
| 2012/0307027 A1 | 12/2012 | Popovic et al. | |
| 2013/0331959 A1 | 12/2013 | Kawai | |
| 2015/0190925 A1 * | 7/2015 | Hoffman .................. | B25J 9/161 700/257 |

OTHER PUBLICATIONS

Chen et al., "Simulation and Graphical Interface for Programming and Visualization of Sensor-based Robot Operation," Proceedings of the 1992 IEEE International Conference on Robotics and Automation, Nice, France, May 1992, pp. 1095-1110.

El-Hakim, "A system for indoor 3-d mapping and virtual environments," Proceedings of the SPIE—The International Society for Optical Engineering, 1997, pp. 21-35, vol. 3174.

Li et al., "Fuzzy Target Tracking Control of Autonomous Mobile Robots by Using Infrared Sensors," IEEE Transactions on Fuzzy Systems, Aug. 2004, pp. 491-501, vol. 12, No. 4.

Roll Jr. et al., "Targeting and sequencing algorithms for the Flectospec's optical fiber robotic positioner," Proceeding of the SPIE—The International Society for Optical Engineering, 1998, pp. 324-332, vol. 3355.

Sanhoury et al., "Switching between formations for multiple mobile robots via synchronous controller," 2012 IEEE 8th International Colloquium on Signal Processing and its Applications (CSPA), 2012, pp. 352-357.

Zhang, Peng, "Chapter 3—System Interfaces for Industrial Control," Industrial Control Technology: A Handbook for Engineers and Researchers, 2008, pp. 259-427.

Grasshopper [online], available online on or before May 19, 2009, [retrieved on Aug. 17, 2017] Retrieved from the Internet: URL (2009 version): <https://web.archive.org/web/20090519001653/http://www.grasshopper3d.com/> (2017 version): <http://www.grasshopper3d.com/>, 20 total pages.

Rhinoceros [online], available online on or before Dec. 23, 1996, [retrieved on Aug. 17, 2017] Retrieved from the Internet: URL (1996 version): <https://web.archive.org/web/19961223083529/https://www.rhino3d.com/> (2017 version): <https://www.rhino3d.com/>, 4 total pages.

Wikipedia [online], "Grasshopper 3D," last updated Aug. 12, 2017, [retrieved on Aug. 17, 2017], Retrieved from the Internet: URL<https://en.wikipedia.org/wiki/Grasshopper_3D>, 5 pages.

Wikipedia [online], "Rhinoceros 3D," last updated Jun. 26, 2017, [retrieved on Aug. 17, 2017], Retrieved from the Internet: URL<https://en.wikipedia.org/wiki/Rhinoceros_3D>, 6 pages.

* cited by examiner

CLOSED-LOOP CONTROL SYSTEM FOR ROBOTIC OPERATION

CROSS REFERENCE TO RELATED APPLICATION

The present application claims priority to U.S. patent application Ser. No. 14/333,335 filed on Jul. 16, 2014 and entitled "Closed-Loop Control System for Robotic Operation" which claims priority to U.S. Provisional patent application Ser. No. 62/001,517, filed on May 21, 2014, and entitled "Closed-Loop Control System for Robotic Operation," which are each herein incorporated by reference as if fully set forth in this description.

BACKGROUND

Unless otherwise indicated herein, the materials described in this section are not prior art to the claims in this application and are not admitted to be prior art by inclusion in this section.

Automated manufacturing processes may involve the use of one or more robotic devices that may be used to construct an output product, such as a car, a wall, a piece of furniture, or any number of other physical fabrications. The robotic devices may be equipped with end-effector-mounted tools, such as a gripper or a drill, that may be used during a construction process. The robotic devices may be programmed with sequences of specific motion commands and commands for other operations in order to cause the robotic devices to complete a manufacturing process.

SUMMARY

The present disclosure provides methods and apparatuses that may help to allow for closed-loop control of robotic operation within a workcell. The workcell may be a manufacturing environment or other environment containing one or more robotic devices and/or other components to enable an automated robotic process. A computing device may display a visual simulation of the robotic devices executing sequences of operations within the workcell. The computing device may send information to a control system indicating data sources to watch as well as how to respond to unexpected deviations by one or more of data sources from a predicted state. The control system may then receive data streams from the data sources during robotic operation. When the control system identifies a deviation by one or more of data sources for which adjustments to robotic operation are indicated, the control system may then provide instructions to the robotic devices to adjust operation on the fly. The control system may also provide information to the computing device to update the visual simulation accordingly.

In one example, a method is provided that includes receiving, by a computing device, input data that identifies one or more data sources to monitor, where the input data further indicates one or more adjustments to make in response to one or more deviations by at least one of the data sources from at least one predicted state during subsequent execution of one or more sequences of operations by one or more robotic devices within a workcell. The method may further include receiving, by the computing device, one or more data streams from the one or more data sources during execution of the sequences of operations by the robotic devices within the workcell. The method may also include identifying, based on the received data streams, a deviation by one of the data sources from a predicted state for which the received input data indicates one or more adjustments to the sequences of operations for the one or more robotic devices. The method may additionally include providing, by the computing device, instructions to the one or more robotic devices to execute the adjusted sequences of operations. The method may further include providing, by the computing device, instructions to a second computing device to update a visual simulation of the one or more robotic devices based on the adjusted sequences of operations.

In a further example, a system including a first computing device and a second computing device is disclosed. The first computing device may be configured to display a visual simulation of one or more robotic devices executing corresponding sequences of operations within a workcell. The second computing device may be configured to receive input data from the first computing device that identifies one or more data sources to monitor, where the input data further indicates one or more adjustments to make in response to one or more deviations by at least one of the data sources from at least one predicted state during subsequent execution of one or more sequences of operations by one or more robotic devices within a workcell. The second computing device may also be configured to receive one or more data streams from the one or more data sources during execution of the sequences of operations by the robotic devices within the workcell. The second computing device may further be configured to identify, based on the received data streams, a deviation by one of the data sources from a predicted state for which the received input data indicates one or more adjustments to the sequences of operations for the one or more robotic devices. The second computing device may additionally be configured to provide instructions to the one or more robotic devices to execute the adjusted sequences of operations. The second computing device may further be configured to provide instructions to the first computing device to update the visual simulation based on the adjusted sequences of operations.

In another example, a non-transitory computer readable medium having stored therein instructions, that when executed by a computing system, cause the computing system to perform functions is disclosed. The functions may include receiving input data that identifies one or more data sources to monitor, where the input data further indicates one or more adjustments to make in response to one or more deviations by at least one of the data sources from at least one predicted state during subsequent execution of one or more sequences of operations by one or more robotic devices within a workcell. The functions may further include receiving one or more data streams from the one or more data sources during execution of the sequences of operations by the robotic devices within the workcell. The functions may also include identifying, based on the received data streams, a deviation by one of the data sources from a predicted state for which the received input data indicates one or more adjustments to the sequences of operations for the one or more robotic devices. The functions may additionally include providing instructions to the one or more robotic devices to execute the adjusted sequences of operations. The functions may further include providing instructions to a second computing device to update a visual simulation of the one or more robotic devices based on the adjusted sequences of operations.

In yet another example, a system may include means for receiving input data that identifies one or more data sources to monitor, where the input data further indicates one or more adjustments to make in response to one or more deviations by at least one of the data sources from at least one predicted state during subsequent execution of one or more sequences of operations by one or more robotic devices within a workcell. The system may further include means for receiving one or more data streams from the one or more data sources during execution of the sequences of operations by the robotic devices within the workcell. The system may also include means for identifying, based on the received data streams, a deviation by one of the data sources from a predicted state for which the received input data indicates one or more adjustments to the sequences of operations for the one or more robotic devices. The system may additionally include means for providing instructions to the one or more robotic devices to execute the adjusted sequences of operations. The system may further include means for providing instructions to a second computing device to update a visual simulation of the one or more robotic devices based on the adjusted sequences of operations.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
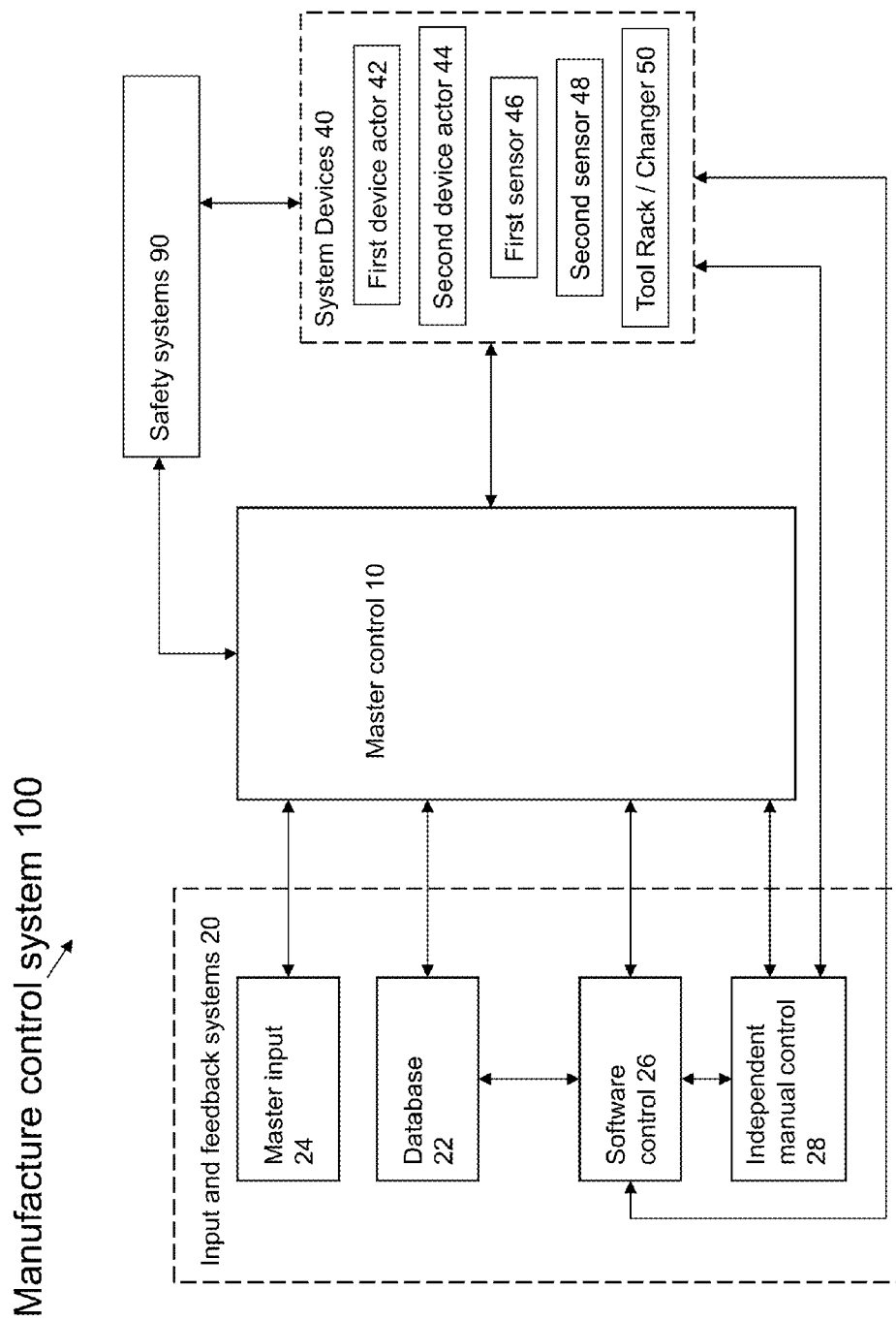
FIG. 1 shows a block diagram of a manufacture control system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example systems and methods may help to provide for closed-loop control of robot operation between a user interface of a computing device and a timing control system. In particular, one or more robotic devices may be programmed from the user interface to execute sequences of operations for manufacturing a product, filming a scene of a movie, or a different purpose within a physical environment, or "workcell." During execution, it may be advantageous for the timing control system to modify certain robot operations in response to an unexpected state of the workcell and/or components within the workcell. For example, a temperature sensor may indicate that the temperature has dropped below a threshold level at which a particular robot can operate. In response, the robot may be instructed to hold position until the temperature rises back above the threshold level. The timing control system may then update the user interface of the computing device to reflect the robot operations actually executed within the workcell.

In an example embodiment, a user interface of a computing device may display a visual simulation of the robots executing sequences of operations. For instance, a geometric representation of robots moving and operating over a sequence of operations or a timeline during a construction process may be shown along with successive states of a product as it is constructed by the robots. In some examples, the user interface may additionally contain functionality for a user to determine the sequences of operations in order to define a process (e.g., a manufacturing process). In further examples, the visual simulation may be run before any physical execution by the robots in order to facilitate determining movements and other operations for the robots. For example, the visual simulation may display warning signals indicating possible errors that may result from execution of particular sequences of operations, such as when a robot exceeds a predefined constraint on its range of motion or when a collision between two robots may occur.

In further examples, a separate timing control system may be used to communicate instructions or other information to and/or from robots and other components during operation. In particular, the control system may include networking functionality in order to facilitate rapid communication with robots and other hardware devices (e.g., using a time interval of 1 second or 100 milliseconds or 10 milliseconds) for precise control of robot movements and operations. In additional examples, sequences of operations may first be determined from the user interface of a computing device, and then transmitted to the control system. The control system may then push instructions out to the robotic devices and/or other hardware components for execution within the workcell.

In further examples, the user interface may additionally allow one or more data sources within the workcell to be identified for the control system to monitor during operation. For example, the data sources may be the robotic devices themselves, sensors positioned within the workcell, or other data sources capable of providing data streams relevant to robotic operation. Through the user interface, instructions for how to respond to deviations in data streams from the identified data sources may also be provided to the control system. For example, the control system may be given instructions on how to modify robotic operation when one of the robots moves outside its pre-programmed motion path, when sensors indicate that a product under construction contains an error, or when the temperature or a different parameter of the environment changes by a certain amount.

During operation, the control system may then monitor the identified data sources for deviations from expected states or behaviors. When a deviation occurs, the control system may responsively modify the sequences of operations for one or more of the robots based on the user-provided instructions. For example, a robot may be instructed to hold position, repeat one or more operations, slow down, speed up, or otherwise modify its behavior. Within examples, by allowing the control system to automatically modify robot behavior, potential problems in operation requiring immediate corrections may be rectified without the need for human user intervention.

In additional examples, the control system may provide information back to the computing device to update the visual simulation. In particular, after modifying sequences of operations for one or more of the robotic devices, information about the modifications may be used to update the visual simulation to reflect actual robot operation within the workcell. For example, the control system may detect that the temperature has dropped below a threshold level, responsively cause a particular robot to hold position, and then transmit instructions to update the visual simulation to reflect the change in robot behavior (e.g., to inform a user of the computing device about the change in operation).

In further examples, the visual simulation may contain other data in addition to or instead of geometric representations of the robotic devices and other components within the workcell. For instance, a portion of the data streams received by the control system may be transmitted to the computing device and displayed within the visual simulation as numerical data or curves. In additional examples, joint parameters of particular robots, sensor values, and/or parameters relating to a product under construction may be displayed within the visual simulation.

In further examples, warning signals may be provided within the visual simulation when data streams received from the control system differ from predicted states or behavior. For instance, if a robot's movements or positions within the workcell differ by a certain amount from the movements or positions indicated by a robotic process designed within the user interface of the computing device, a warning signal may be displayed to indicate possible unexpected behavior. Many other types of warning signals indicating unexpected states or behaviors may also be displayed within the visual simulation.

II. Example Control Systems

Example embodiments may provide for motion planning and control of multi-axis robotic systems for use in the manufacturing and making industries. Example design-to-production systems may allow users to change parameters describing an output product on the front end, with the effects propagated through to a product manufactured by one or more robotic devices using one or more tools. In some examples, users may be provided with a graphical interface that allows for the configuration of the robot actors using a diverse toolset in order to automate the building process. In further examples, robot motions may be abstracted so that users don't have to program specific robot commands (e.g., motion commands or tool commands) in order to control the building process. Accordingly, users may be able to design a building process without specific knowledge of commands for particular types of robots. Additionally, users may be provided with one or more interfaces that allow for varying amounts of control over specific robot operations within a manufacturing process, during offline motion programming and/or during runtime.

In further examples, users may be provided with a three-dimensional (3D) modeling graphical interface that allows the user to alter one or more variables describing a physical workcell and/or a desired output product that affect a building process in the physical world. Additionally, the user interface may provide abstract ways to represent physical objects digitally as nodes within a software environment. In particular, the user experience may enable users to select from an array of tools which can be configured and combined in a number of different ways to control different types of robot actors and hardware components within a physical workcell.

In further examples, the physical workcell may include a physical stage or stages on which a physical building process is planned or is occurring within the physical world. In some examples, the physical workcell may include a variety of different robot actors and other hardware components as well as physical materials that may be used in the building process. In further examples, the physical workcell may contain a tool rack and/or an automated tool changer. In additional examples, the physical workcell may contain one or more different types of sensors. Also, the physical workcell may include any number of different dimensions, including platforms for particular building activities.

It should be understood that the present disclosure is not to be limited in terms of the particular embodiments described in this application, which are intended as illustrations of various aspects. Numerous components of example manufacturing systems are described herein. Systems that contain only some of those components or any combination of such components are contemplated as well. Many modifications and variations can be made without departing from the spirit and scope of the disclosed systems and methods. Functionally equivalent methods and apparatuses within the scope of the disclosure, in addition to those enumerated herein, will be apparent to those skilled in the art.

Example embodiments may involve use of a manufacture control system to create automated programming of robotics arms during a building process. FIG. 1 describes an example manufacture control system 100. Manufacture control system 100 may be part of a manufacturing environment used to control one or more robotic devices to use one or more tools to construct some output product. Manufacture control system 100 may comprise a master control 10, input and feedback systems 20, system devices 40, and safety systems 90. From the most basic perspective, manufacture control system 100 may function when an input system 20 provides instructions to one of system devices 40 via master control 10.

In one potential embodiment as part of a manufacture control system 100, input and feedback systems 20 may include a database 22, a master input 24, a software control 26, and an independent manual control 28. As part of the input and feedback systems 20, database 22 may operate to provide a set of timing and position data to direct all or a portion of device actors 42, 44 within system devices 40. Two device actors 42, 44 are shown in FIG. 1, but any number of device actors could be used within manufacture control system 100. Alternatively, database 22 may store data being created by manual or individual movement or data input related to operation and function of device actors 42, 44. Database 22 may also store data created independently of device actors 42, 44, such as data created using software modeling features of a software control 26.

A master input 24 may be any device that functions to operate all of the device actors 42, 44 associated with a particular building process being executed by manufacture control system 100. Master input 24 may function by sending input control signals to master control 10. Master control 10 may then adapt the signal from master input 24 to send individual control signals to a plurality of robot actors operating as device actors 42, 44 for a particular manufacturing process. In one potential embodiment, every individual device of device actors 42, 44 may be provided a control signal from master control 10 when a signal is received from master input 24, including a signal to maintain a status quo or non-action to devices that are not operating as device actors 42, 44 for a particular part of the manufacturing process. In an alternative embodiment, a portion of the device actors 42, 44 connected as part of manufacture control system 100 may not be sent any signal from master control 10 as part of the operation of motion control system 100 for a particular part of the manufacturing process.

In some examples, software control 26 may act as a replacement for master input 24 in sending control signals to the plurality of device actors 42, 44 via the master control 10. Alternately, software control 26 may control individual devices from among device actors 42, 44 to control particular operations of the individual device. In other potential embodiments, software control 26 may function to model the behavior of individual devices of device actors 42, 44 within a virtual modeling environment representative of a physical workcell. In such an embodiment, software control 26 may contain a software model for an individual device, which allows control signals to be created for the device without actually sending the control signals to the device. The control signals may then be stored in the software control 26, in database 22, within a computer memory component that is part of master control 10, or within computer memory that is part of the device of device actors 42, 44 for which the controls are being created. After the control signal is created by software control 26 and propagated to the appropriate storage location, a master control signal from software control 26 or from master input 24 may activate the control signal for the individual device to act in conjunction with other device actors 42, 44.

In further examples, certain devices of device actors 42, 44 may additionally have an independent manual control 28. As described above with respect to software control 26, control signals for an individual device may be created in software modeling. In addition or instead, a device may have independent manual control 28 that may be used to operate a device of device actors 42, 44. When a set of instructions is being created for an entire manufacturing process, the independent manual control 28 may be given input commands over time that are recorded to database 22 or a memory device of master control 10. During creation of a set of instructions using independent manual control 28, the independent manual control 28 may communicate directly with the associated device of device actors 42, 44. Alternatively, the independent manual control 28 may send a control signal to master control 10, which then conveys the signal to the associated device of device actors 42, 44.

The control signal may then be created either from the signal of the independent manual control 28 (e.g., a separate user interface), or from a measured feedback reading created by the operation of the associated device. Additionally, although in many situations, it may be preferable to have the independent manual control 28 actually control the associated device during control signal creation in real time, control signals may instead be created without controlling the device. For example, if input signals are expected for certain time marks, an independent manual control 28 may be operated independent of the related device, and the control operation may be recorded. Accordingly, instructions for individual device actors of device actors 42, 44 from independent manual control may be integrated into a building process as part of manufacture control system 100.

In further examples, master control 10 may allow for real-time control of components of a building system by providing a link between a virtual world (e.g., software control 26) and the physical world (e.g., a physical workcell containing device actors 42, 44). Accordingly, movements of a physical robot within the physical world may be used to drive the current position of a corresponding virtual robot in real time. Similarly, movements of a virtual robot may be used to drive the current position of a physical robot in the physical world as well or instead.

In one potential embodiment, individual control signals for specific device actors may be coordinated into a single file within a memory of a master control with a common base time provided by a master clock within the master control. During operation, the master control may extract control signals for each device actor and provide individual control signals to each device actor at the appropriate intervals. In an alternative embodiment, the master control may maintain separate individual control signal files and timing data for different device actors, and synchronize the different control signals separately from the individual control files.

In another alternative embodiment, the control data for a portion of the device actors may be transferred by a master control to a memory within an associated individual device actor. During operation, device actors having control data within memory may receive a synchronization signal that indicates a location in a global timeline, a rate of progress through a global timeline, or both.

Network support may also enable communications from master control 10 to one or more of system devices 40. In one potential embodiment, a network may comprise an EtherCAT network operating according to IEEE 1588. In such an embodiment, packets may be processed on the fly using a field bus memory management unit in each slave node. Each network node may read the data addressed to it, while the telegram is forwarded to the next device. Similarly, input data may be inserted while the telegram passes through. The telegrams may only be delayed by a few nanoseconds. On the master side, commercially available standard network interface cards or an on-board Ethernet controller can be used as a hardware interface. Using these interfaces, data transfer to the master control via direct memory access may be achieved with no CPU capacity taken up for the network access. The EtherCAT protocol uses an officially assigned Ether Type inside the Ethernet Frame. The use of this Ether Type may allow transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence may be independent of the physical order. Broadcast, multicast, and communication between slaves are possible.

Transfer directly in the Ethernet frame may be used in cases where EtherCAT components are operated in the same subnet as the master controller and where the control software has direct access to the Ethernet controller. Wiring flexibility in EtherCAT may be further maximized through the choice of different cables. Flexible and inexpensive standard Ethernet patch cables transfer the signals optionally in Ethernet mode (100 BASE-TX) or in E-Bus (LVDS) signal representation. Plastic optical fiber (POF) can be used in special applications for longer distances. The complete bandwidth of the Ethernet network, such as different fiber optics and copper cables, can be used in combination with switches or media converters. Fast Ethernet (100 BASE-FX) or E-Bus can be selected based on distance requirements.

Further, such an embodiment using EtherCAT supports an approach for synchronization with accurate alignment of distributed clocks, as described in the IEEE 1588 standard. In contrast to fully synchronous communication, where synchronization quality suffers immediately in the event of a communication fault, distributed aligned clocks have a high degree of tolerance from possible fault-related delays within the communication system. Thus, data exchange may be completely done in hardware based on "mother" and "daughter" clocks. Each clock can simply and accurately determine the other clocks' run-time offset because the communication utilizes a logical and full-duplex Ethernet physical ring structure. The distributed clocks may be adjusted based on this value, which means that a very precise network-wide time base with a jitter of significantly less than 1 microsecond may be available.

However, high-resolution distributed clocks are not only used for synchronization, but can also provide accurate information about the local timing of the data acquisition. For example, controls frequently calculate velocities from sequentially measured positions. Particularly with very short sampling times, even a small temporal jitter in the displacement measurement may lead to large step changes in velocity. In an embodiment comprising EtherCAT, the EtherCAT expanded data types (timestamp data type, oversampling data type) may be introduced. The local time may be linked to the measured value with a resolution of up to 10 ns, which is made possible by the large bandwidth offered by Ethernet. The accuracy of a velocity calculation may then no longer depend on the jitter of the communication system.

Further, in an embodiment where a network comprises EtherCAT, a hot connect function may enable parts of the network to be linked and decoupled or reconfigured "on the fly". Many applications require a change in I/O configuration during operation. The protocol structure of the EtherCAT system may take account these changing configurations.

In further examples, safety systems 90 may be provided for preventative safety in detecting potential collisions between device actors in modeling the motion of the actors through a global timeline. Further, such modeling through a global timeline may be used to set safety parameters for safety systems 90. Modeling of locations and velocities of device actors through a global timeline may enable identification of unsafe zones and unsafe times in an area of a physical workcell. Such an identification may be used to set sensing triggers of object detectors that are part of an example safety system. For example, if an area within 5 feet of a certain device actor is determined to be at risk of collision, and a buffer zone of 10 additional feet is required to insure safety during operation, a LIDAR detector may be configured to detect unexpected objects and movement within a 15 foot area of the device actor during operation, and to automatically create a safety shutdown if an object is detected. In an alternative embodiment, the LIDAR detector may be configured to create a warning signal if an object is detected in a periphery of the danger zone, and only to create a shutdown if the detected object is moving toward a potential impact zone.

In an alternate embodiment, safety systems 90 may include modeling of actors and models of defined safe zones. Analysis of the motion of the actors in software control may allow a modeled safety check to see if any actor collides with a defined safe zone. In some examples, safe zones may be defined by entry of fixed volumes of space into a software control, by image capture of a physical workcell. Safe zones may also be defined to be variable based on a detected motion, jerk, velocity, or acceleration of an object in a safe zone. In an alternate embodiment, a safe zone may be defined by input from transponder device data. For example, a transponder location device may be attached to a robotic device actor, and a safe zone defined by a distance from the transponder. The transponder may feed location data to software control, which may update safe zones within a software control or within a master safety control. In another embodiment, fixed safe zones may be defined within software control, and published prior to a safety PLC within a master safety control prior to operation of a building process.

In some examples, system devices 40 may additionally include one or more sensors 46 and 48, such as laser-based, infrared, or computer vision-based sensors. Master control 10 may stream data in from one or more different types of sensors located within the physical workcell. For instance, data from the sensors may reflect dimensions or other properties of parts and/or materials within a physical workcell, as well as how the parts and/or materials are currently positioned within the real world. This data may then be streamed out to one or more robotic device actors 42 and 44 within the environment to control robotic actions, such as to accurately define a pick-up point or to adjust the pressure applied to a particular material to avoid damaging the material.

In further examples, robotic device actor 42, 44 may be configurable to operate one or more tools for use in construction, such as spindles, grippers, drills, pincers, or welding irons. In some examples, robotic device actors 42, 44 may be able to switch between one or more tools during a building process using a tool rack and/or automated tool changer 50. For instance, master control 10 may contain programming logic in order to automate the selection and equipping of tools from tool rack 50. In other examples, instructions to cause one of the robotic device actors 42, 44 to change tools using the tool rack/tool changer 50 may come from independent manual control 28 as well or instead.

III. Example System Devices

Referring now to FIGS. 2A-2C and 3A-C, several non-limiting examples of system devices 40, including robotic device actors 42, 44 and a tool rack/tool changer 50 will be described. Although these figures focus on the use of robotic arms, other types of device actors 42, 44 or system devices 40 may be used in some examples as well or instead.

Figure 2A:
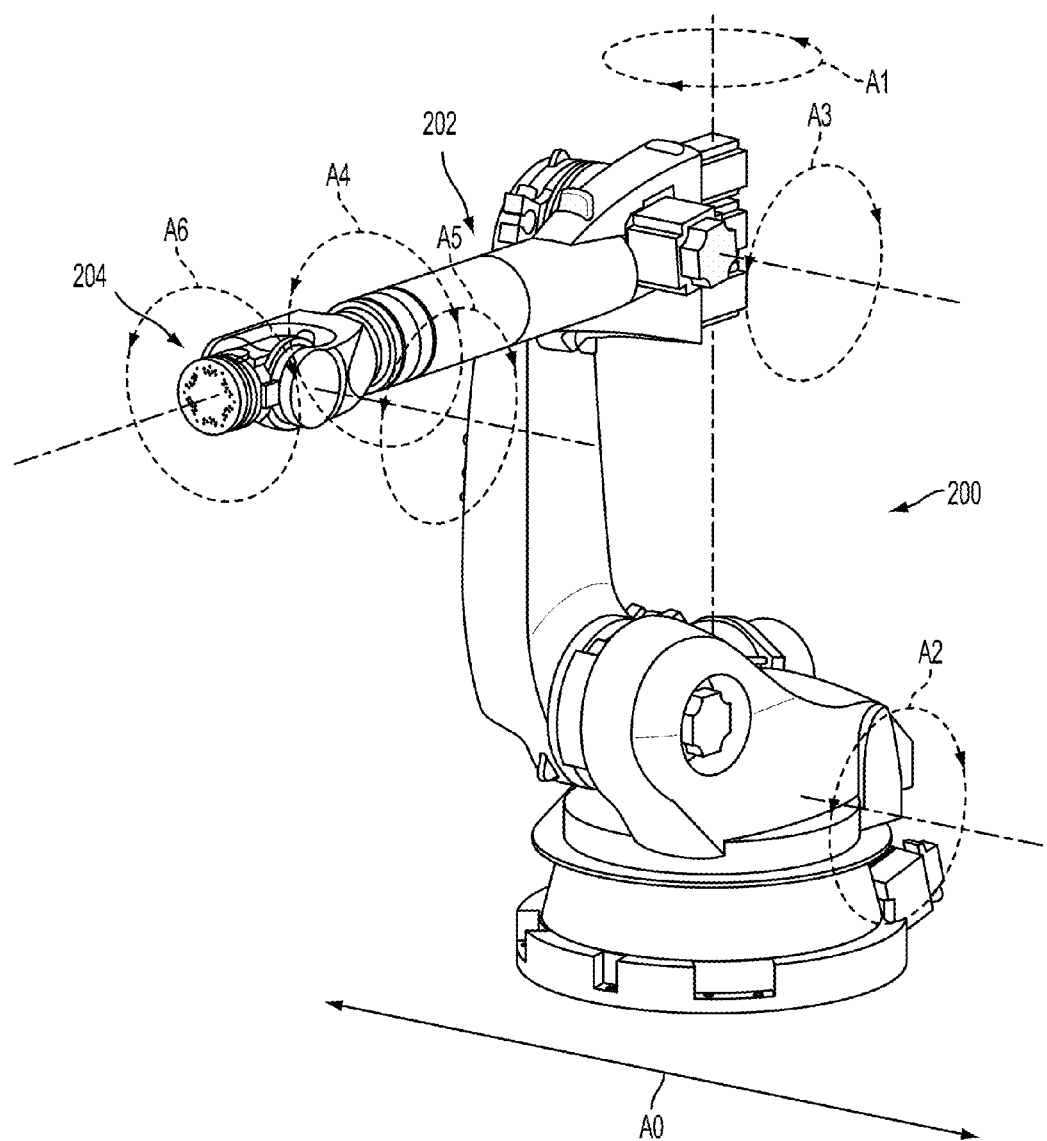
FIG. 2A shows a view of a robot with 7 degrees of freedom, according to an example embodiment.

FIG. 2A illustrates a robotic device actor, according to an example embodiment. In particular, robotic device actor 200 may include a robotic arm 202 with an end effector 204 capable of being equipped with one or more different tools. The robotic arm 202 may be capable of motion along six degrees of freedom, depicted in FIG. 2A as A1-A6. In certain examples, robotic device actor 200 may be further capable of motion along one or more axes A0, such as along a rail which is not shown that allows side to side movement. In certain embodiments, instructions may be given to position end effector 204 at a specific location, and the positions of the robotic arm 204 along A1-A6 and/or of robotic device actor 200 along one or more axes A0 may be calculated by a process of the related manufacture control system. In alternative embodiments, position control of robotic device actor 200 and/or robotic arm 202 may require separate, individual settings and control commands. Robotic devices operating with fewer degrees of freedom may be used in some examples as well or instead.

Figure 2B:
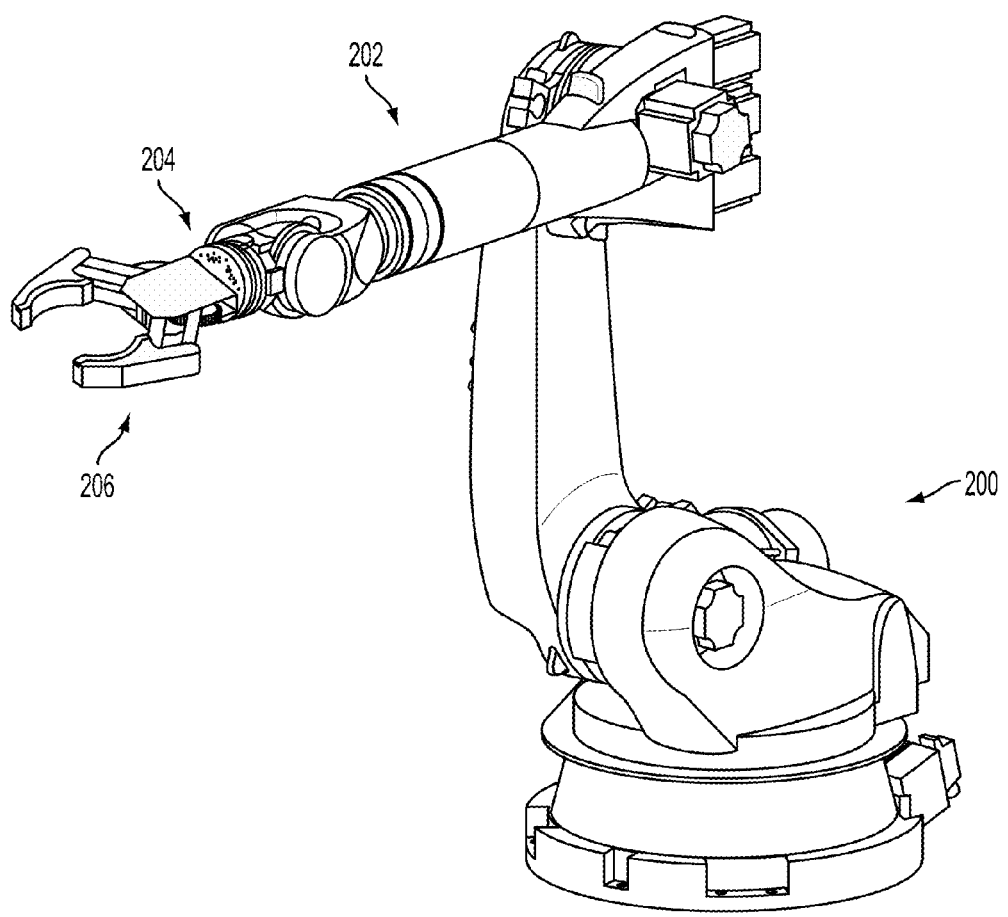
FIG. 2B shows a view of a robot with an attached gripper, according to an example embodiment.

FIG. 2B illustrates robotic device actor 200 equipped with a gripper 206. In particular, the gripper 206 may be placed at end effector 204 of the robotic arm 202. The gripper 206 may be used for various functions during a building process, such as picking up objects or parts, moving objects or parts, holding objects or parts, and/or placing objects or parts. A variety of different types of grippers may be used, such as a vacuum gripper, a tumble gripper, or a passive centering gripper. Additionally, grippers with different dimensions or other properties may be used, possibly to coincide with different types of robot actors within a physical workcell.

Figure 2C:
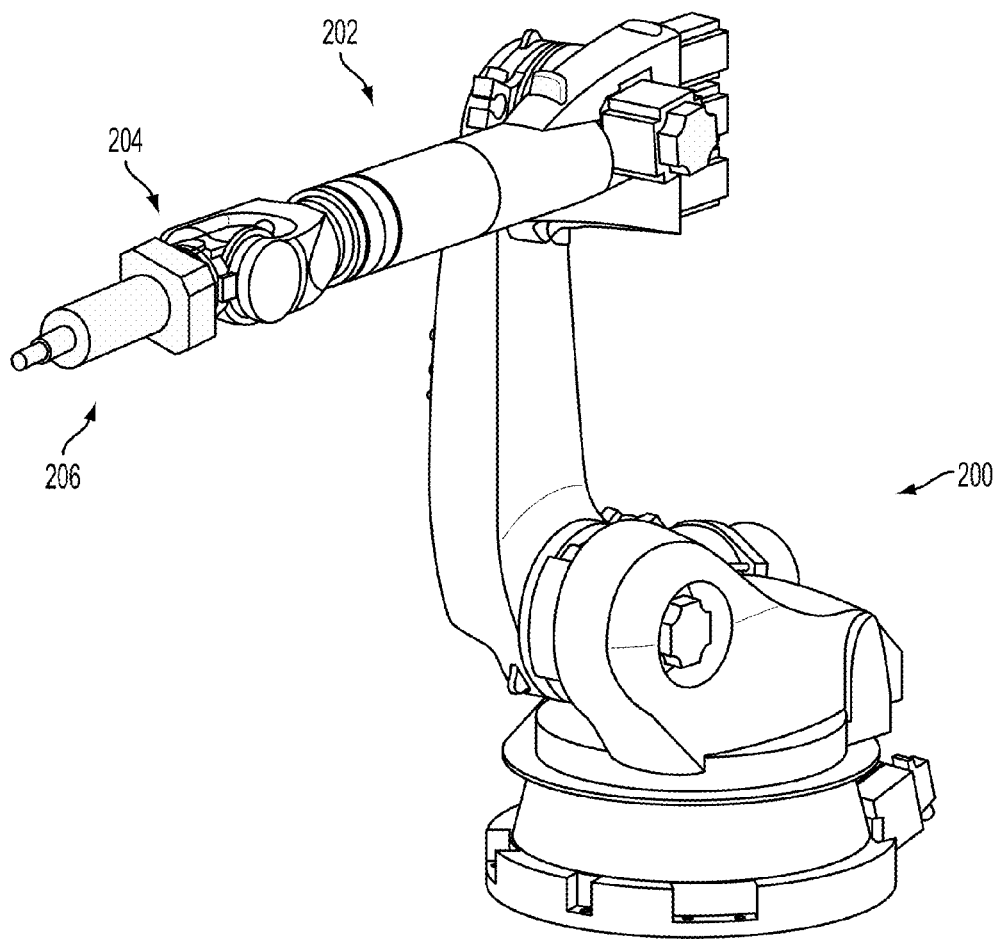
FIG. 2C shows a view of a robot with an attached spindle, according to an example embodiment.

FIG. 2C illustrates robotic device actor 200 equipped with a spindle 208. A spindle 208 may include a rotating axis for use in various functions within a building process, such as cutting materials, shaping materials, milling or routing. The spindle 208 could be a variety of different types, such as a grinding spindle, an electric spindle, a low-speed spindle, or a high-speed spindle. Additionally, spindles with different dimensions or other properties may be used, depending on the different types of robot actors within a physical workcell. In some examples, other types of tools may be used by robotic device actors as well or instead.

Figure 3A:
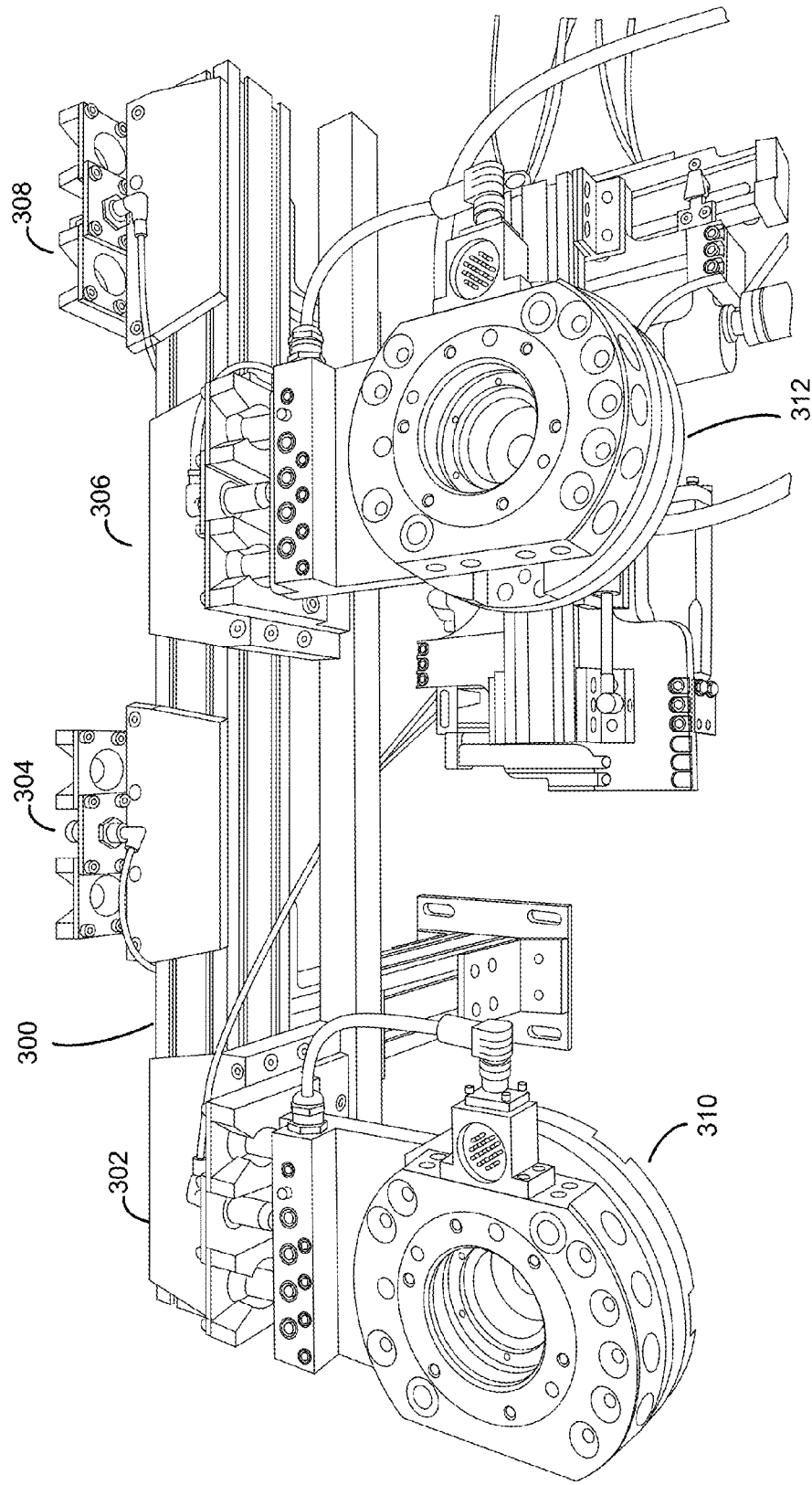
FIG. 3A shows a view of a tool rack, according to an example embodiment.

FIG. 3A illustrates a tool rack, according to an example embodiment. The tool rack may contain a number of different fabrication tools (e.g., spindles or grippers) and may be used along with an automated tool changer in order to equip robotic devices with particular tools to use within a physical workcell. In some examples, the tool rack may contain several tool rack modules 302, 304, 306, 308 positioned along a track 300, with each of the tool rack modules 302, 304, 306, 308 containing one or more particular tools. In some examples, one or more of the tool rack modules 302, 304, 306, 308 may be moveable along the track 300. In further examples, a tool rack module may be capable of interfacing with a slave module that allows for a particular tool to be selected from the tool rack module and then equipped onto a robotic device. For instance, referring to FIG. 3A, tool rack module 302 may interface with slave module 310 and tool rack module 306 may interface with slave module 312.

In order to facilitate tool changing, the tool rack modules may be equipped with built-in safety sensors to minimize the risk of accidental tool fetch and drop commands. Additionally, the tool change slave modules may include input/output ("IO") breakout boxes to simplify passing IO trigger signals to control tools. In some examples, the IO breakout boxes may interface with a timing control system, such as master control 10 described with respect to FIG. 1, that controls the robotic devices within a physical workcell. Master control 10 may be used to direct a tool change for a particular robotic device, which may be configured in advance using software control 26 and/or from independent manual control 28 during runtime.

Figure 3B:
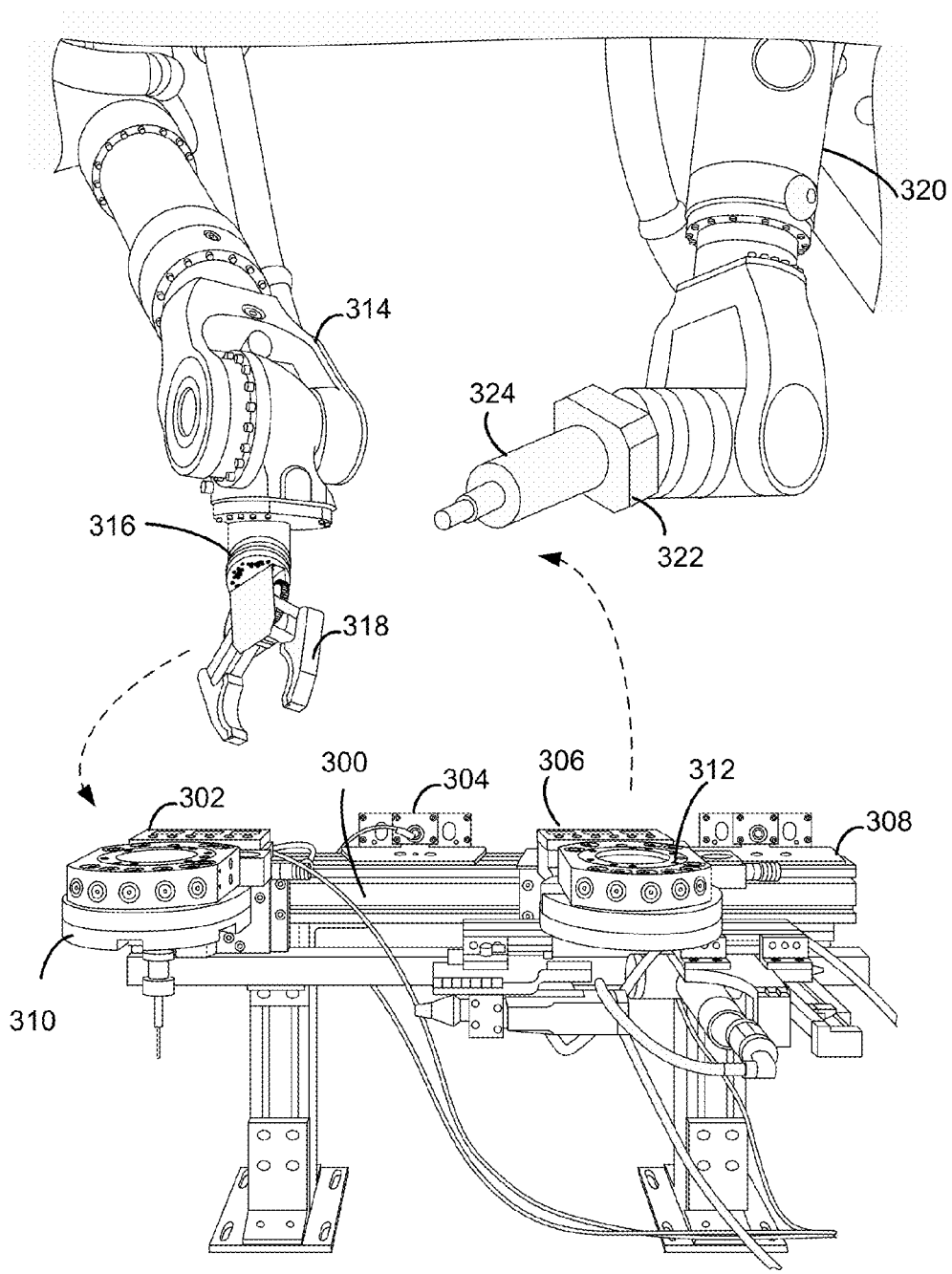
FIG. 3B shows a view of a tool rack and two robots, according to an example embodiment.

FIG. 3B illustrates use of the tool rack to equip robotic devices with tools, according to an example embodiment. In particular, a first robotic device 314 may move its end effector 316 to a position over a slave module 310 that interfaces with a tool rack module 302 of a tool rack. For instance, the robotic device 314 may currently be equipped with gripper 318, and may be controlled to move to to the tool rack in order to place gripper 318 in the tool rack and equip a different tool held by tool rack module 302. Additionally, a second robotic device 320 may have positioned its end effector 322 on slave module 312 in order to equip spindle 324, which may have been held by slave module 312. After equipping spindle 324, robotic device 320 may then proceed to move away from the tool rack and complete operations using the spindle 324. The tool rack modules may be positioned on the tool rack so that multiple robotic devices may equip or change tools at the same time. In some examples, additional rack modules 304, 308 may contain additional tools that may be equipped by one or more robotic devices.

In further examples, instructions from a control system, such as master control 10 described with respect to FIG. 1, may be used in order to instruct a robotic device how to equip a tool during runtime (e.g., to determine where a tool is within the tool rack and solve an end effector problem in real time in order to position the end effector over a slave module to enable the robotic device to pick up the tool). In additional examples, a drive system (e.g., a VFD used to supply power drive a spindle) may be mounted at a separate fixed location within a physical workcell in order to supply power on the tool changer system.

IV. Example Graphical Interfaces

Figure 4A:
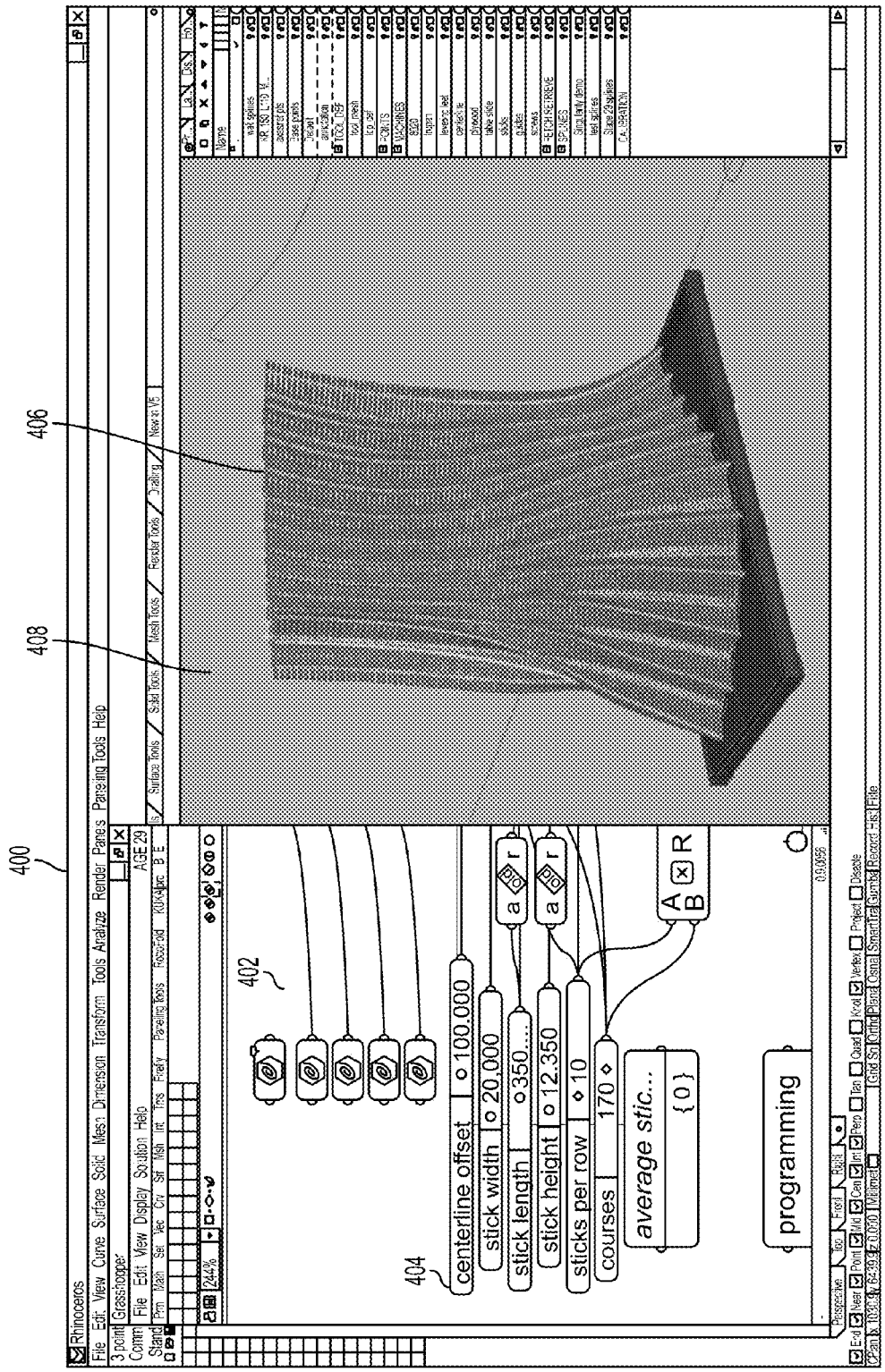
FIG. 4A shows a graphical interface with a 3D model, according to an example embodiment.

FIG. 4A shows a graphical interface containing a 3D model, according to an example embodiment. As shown, a graphical interface 400 may contain an input window 402 which may allow a user to enter parameters relating to an output product 406, such as a wall built using individual sticks. The input window 402 may allow the user to enter parameters 404 that may relate to aspects of the output product, including dimensions, density, curvature properties, other geometric properties, materials to be used, and/or other numeric inputs. The inputs may be used to derive a parametric solution for an output product 406. Additionally, the inputs may be used to generate a sketch of the output product 406 within a display window 408 of the graphical interface 400.

Figure 4B:
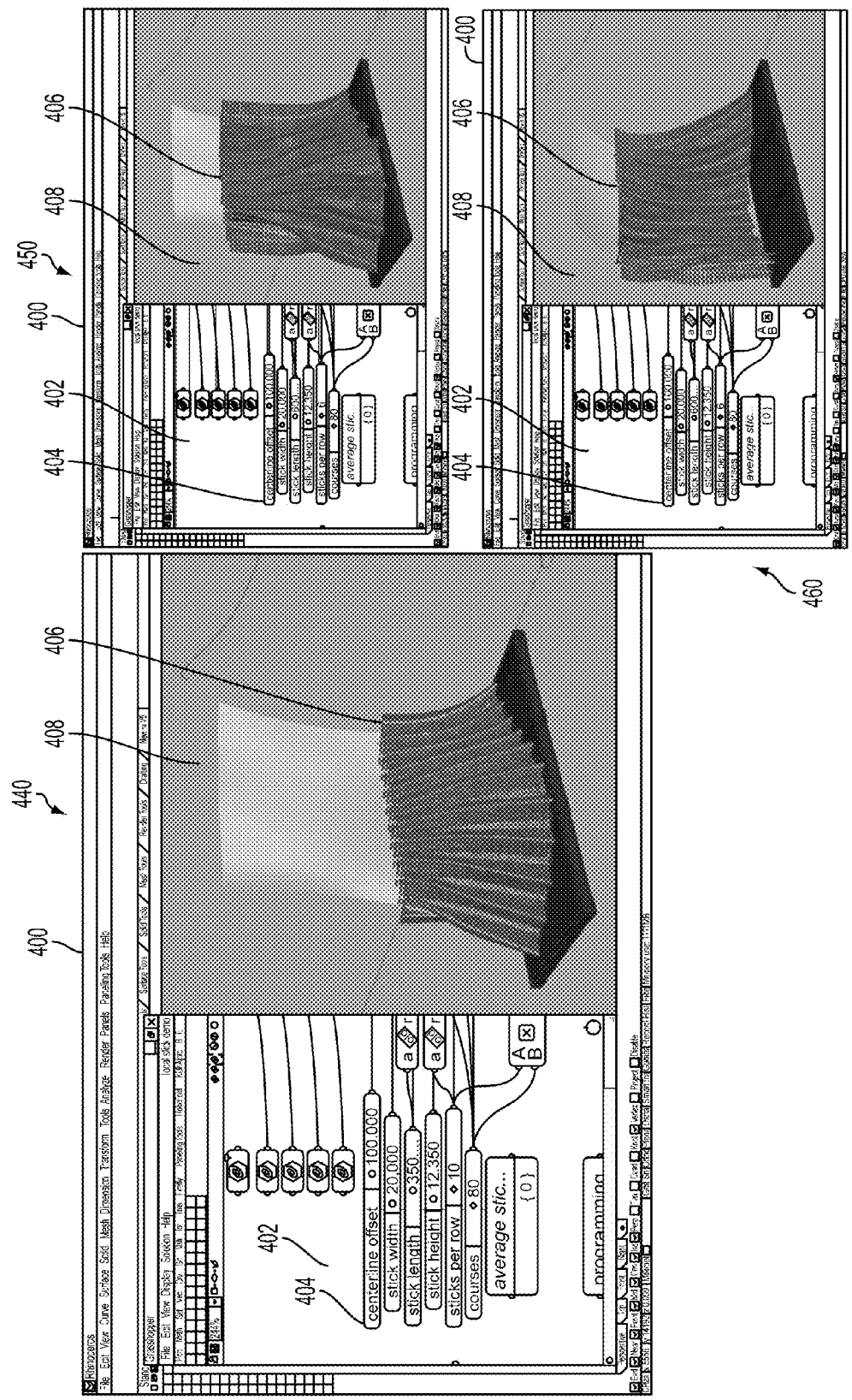
FIG. 4B shows additional graphical interfaces with 3D models, according to an example embodiment.

FIG. 4B shows three different output products based on different user input parameters, according to an example embodiment. A first view of the graphical interface 440 may contain an input window 402 and a display window 408. The input window 402 may allow a user to enter parameters 404 relating to a desired output product, including product dimensions, density, curve offsets, amount or type of curvatures, and/or other geometric or numerical inputs. Based on the input parameters 404, a geometric representation of the output product 406 may be displayed within the display window 408. In some examples, a user may modify individual parameters 404 in order to change aspects of the output product 406.

For instance, a second view of the graphical interface 450 shows a different output product 406 within the display window 408 based on different input parameters 404 within the input window 402. In this example, dimensions of the output product 406 and/or materials used to produce the output product 406 may be modified to produce an output product 406 with a greater height as shown in the second view 450. Further, a third view 460 shows another different output product 406 within the display window 408 based on different input parameters 404 within the input window 402. For example, parameters relating to the curvature of the output product may be modified by a user in order to produce another different output product 406 as shown in the third view 460.

Figure 5:
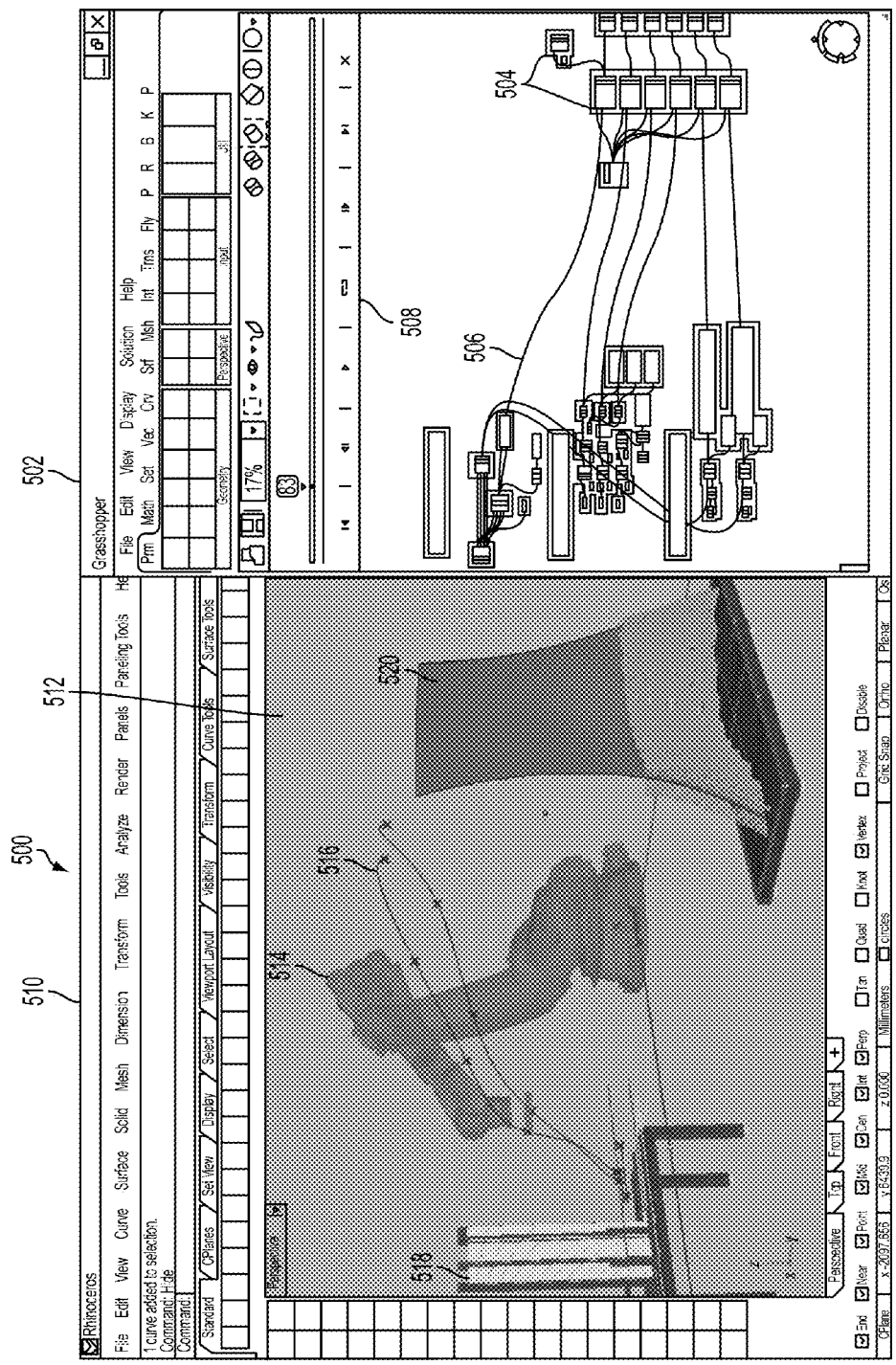
FIG. 5 illustrates a node-based graphical interface and a visualization of a building process, according to an example embodiment.

FIG. 5 shows a graphical interface for architecting a robotic building process, according to an example embodiment. For example, the graphical interface may be part of software control 26 as described above with respect to FIG. 1. As shown, a graphical interface 500 may contain an input window 502 which allows a user to control aspects of the building process, including nodes related to robot actors, tools, motion paths, and tool operations for use during construction. The graphical interface 500 may additionally contain a display window 510 which contains a 3D geometric view of the physical workcell, including components such as robot actors, tools, materials, and/or constructed output products. In example embodiments, the input window 502 may provide a visual programming interface or different type of interface that may allow a user to enter parameters describing a desired output product and/or information about the actors and tools to be used in the building process. Input data collected using the input window 502 may be used to control geometry and/or other aspects of the physical workcell displayed within the display window 510.

In one example, a user may input parameters to control a building process using an input window 502 containing a visual programming interface, such as an interface built using a visual programming language, such as a commercial software program known as Grasshopper. The interface may allow a user to include one or more nodes 504 which may represent components of the building process, such as robot nodes representing different types and/or configurations of robots, tool nodes representing different types and/or configurations of tools, IO nodes representing types of available IO, track nodes representing possible tracks of motion of robot actors, and command nodes for determining motion commands and other types of commands for robot actors.

As shown within window 502 of FIG. 5, individuals nodes 504 may be connected together using connectors 506. A connector 506 between two nodes may indicate that the output of a first node is to be used as an input to a second node. For instance, a single robot node may receive as inputs information from several different component nodes, such as nodes representing the type of robot, the type of tool used by the robot, a track the robot can travel along, and so on.

In further examples, the window 502 of FIG. 5 may contain a timeline 508. The timeline 508 may have a cursor representing a current timestamp (e.g., 83 as shown in the figure) which may represent a particular point in time of the manufacturing process. In addition, the timeline 508 may contain buttons to play through the building process at a particular speed, or fast-forward or rewind through the building process. The timeline 508 may be used to control the point in time at which the geometry and/or other aspects of the physical workcell are displayed within the display window 510. Further, the timeline 508 may be used to indicate a particular point in time either for purposes of simulating the building process or for visualizing within software an actual physical building process taking place within the physical world.

As shown in FIG. 5, the user interface may additionally contain a display window 510 which may display geometry and/or other aspects of the physical workcell based on inputs from the input window 502. For example, the display window 510 may include geometry relating to robot actors, tools, building materials, robotic motion paths, and output products, among other things. In one example, the display window 510 may be designed using a commercial 3D modeling software, such as Rhinoceros, as shown within FIG. 5. The display window 510 may display geometry within a particular physical workcell 512. The display window 510 may include options to change the perspective of the physical workcell 512 and/or to zoom in or zoom out a view of the physical workcell 512.

The physical workcell 512 may include one or more robot actors 514. The robot actors 514 may be device actors 42 and/or 44 as described above with respect to FIG. 1 and/or robotic device 200 as described with respect to FIGS. 2A-2C. Support may be provided for numerous different types of multi-axis robotic systems of different types and/or from different manufacturers. In some examples, one or more of the robot actors 514 may be traditional six-axis robots. In additional examples, other types of robots that may be configured to operate along fewer or more axes may be included for use within the physical workcell 512 in addition or instead.

In further examples, robot actors may be represented within a software interface as robot nodes, which may be put together from a number of interchangeable component nodes, including robot nodes representing different makes and models of commercial robots, tool nodes representing different types of physical tools that may be used for construction such as grippers or spindles, IO nodes representing different types IO available to communicate with a robot actor and track nodes representing different types of axes that a robot can move along. In some examples, individual tools and/or tooling parameters (such as wrist mount offsets or tool center points) can be abstracted into components that can be assembled by a user into compound tools as well.

The display window 510 may additionally contain one or more motion paths 516 representing paths of motion of individual robot actors 514. The motion paths 516 may indicate paths to be taken by the robot actors 514 during the building process, such as to pick up materials and attach them to an object under construction. In some examples, the motion paths 516 may further indicate points at which particular input or output actions will occur. For instance, an "x" on a motion path 516 may indicate a point at which a robot actor 514 uses a tool such as a gripper to pick up a particular type of material. In further examples, the motion paths 516 may be synchronized with the timeline 508 from the input window 502. Accordingly, in some examples, the robot actors 514 may be made to move along the motion paths 516 to positions at particular points in time based on the timestamp indicated by the timeline 508.

The physical workcell 512 may additionally contain one or more materials 518 to be used during the building process. In this simplified example, the materials 518 consist of sticks used to construct a wall 520. Motion paths 516 may be determined for the robot actor 514 to take in order to move the individual sticks 518 onto the wall 520. In other examples, a variety of different types of materials, including connective materials such as glue, may be used simultaneously by the robot actors to construct more complex output products.

In further examples, the physical workcell 512 may also contain other components not shown in FIG. 5 that may be used in the building process. For instance, one or more sensors may be included to sense information about the robot actors and/or materials in the physical workcell in order to influence motion paths taken by the robot actors. For example, a torque sensor may be used to determine if a particular piece of material is likely to break under stress. A control system, such as master control 10 described above with respect to FIG. 1, may be used to interface with the robot actors and/or sensors within the physical workcell.

In some examples, the display window 510 may provide users with multiple 3D views of the physical workcell, and may allow a user to change the orientation and/or zoom of a particular view. In other examples, the display window 510 may present other types of representations of the physical workcell, such as numerical representations, as well or instead.

V. Example System Workflow

Figure 6A:
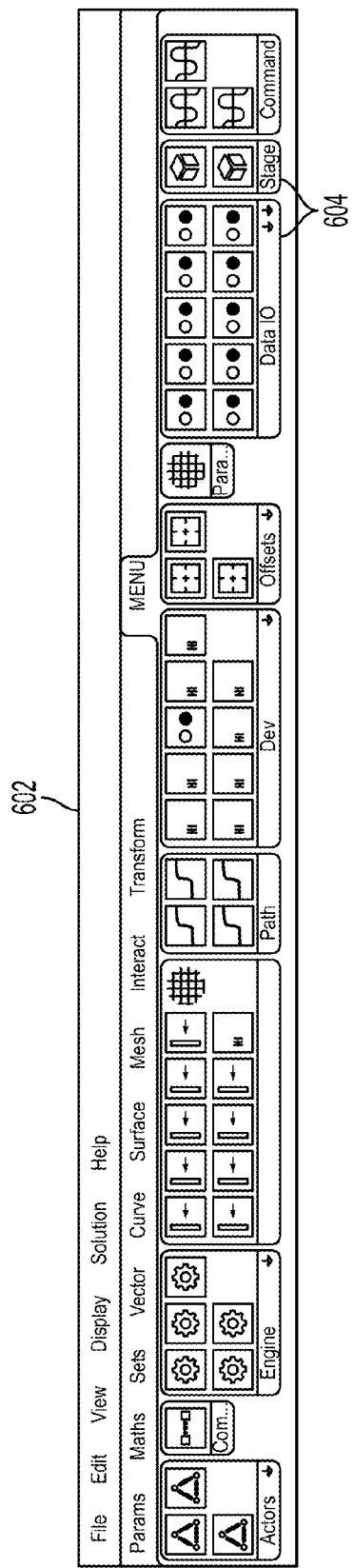
FIG. 6A illustrates a toolbar for a graphical interface, according to an example embodiment.

In some examples, an input window may additionally contain a toolbar containing digital tools to control aspects of the building process. FIG. 6A shows a toolbar for a graphical interface, according to an example embodiment. The toolbar 602 may be equipped with a variety of different toolsets 604 that may be used to design or control a building process within an input window of a graphical interface. Toolsets 604 may be provided with digital tools relating to generating robot motion paths, transforming between different planes or axes, describing robot actors, describing physical building tools, sequencing individual robot motions, communicating data input and/or output to and/or from robot actors, mapping between a virtual software environment and a physical workcell, and/or enabling visualization of a building process, for example.

Figure 6B:
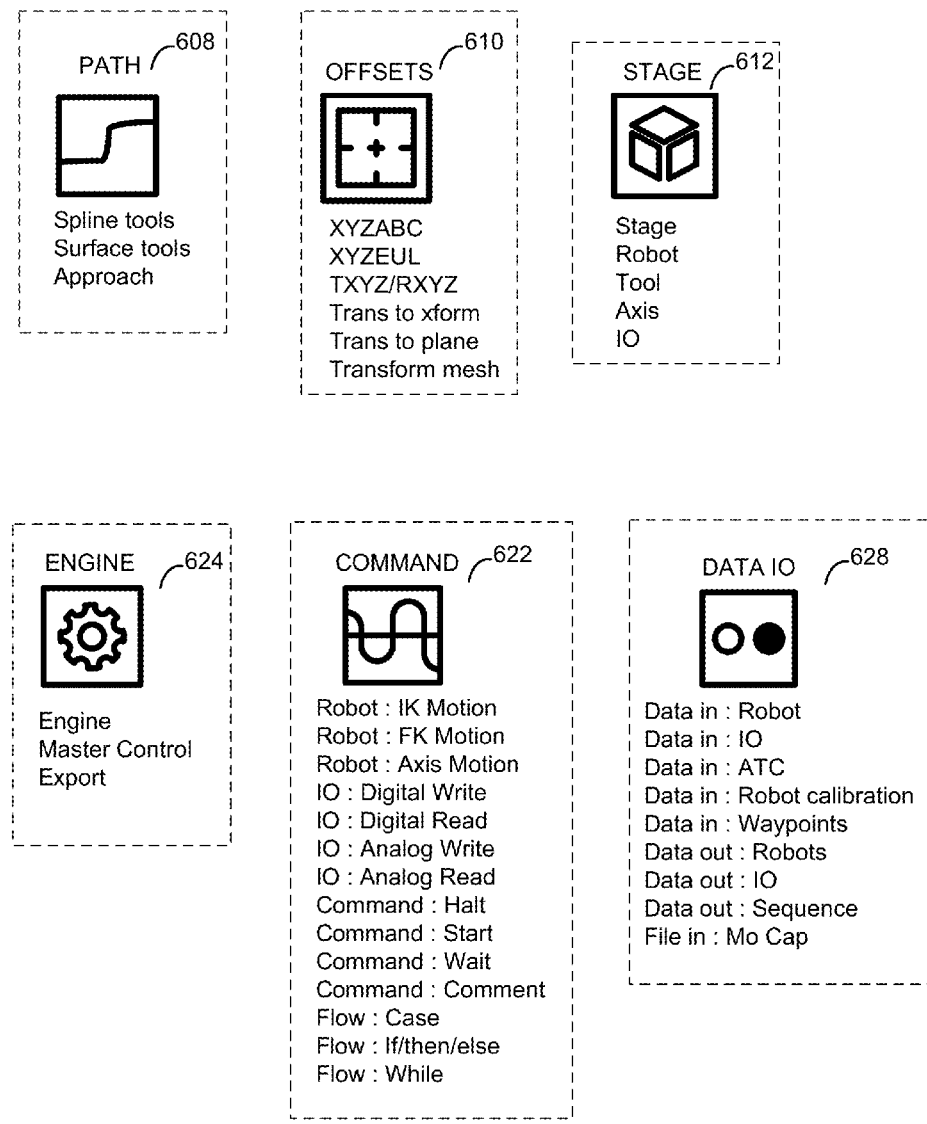
FIG. 6B illustrates an organization of digital tools, according to an example embodiment.
Figure 6C:
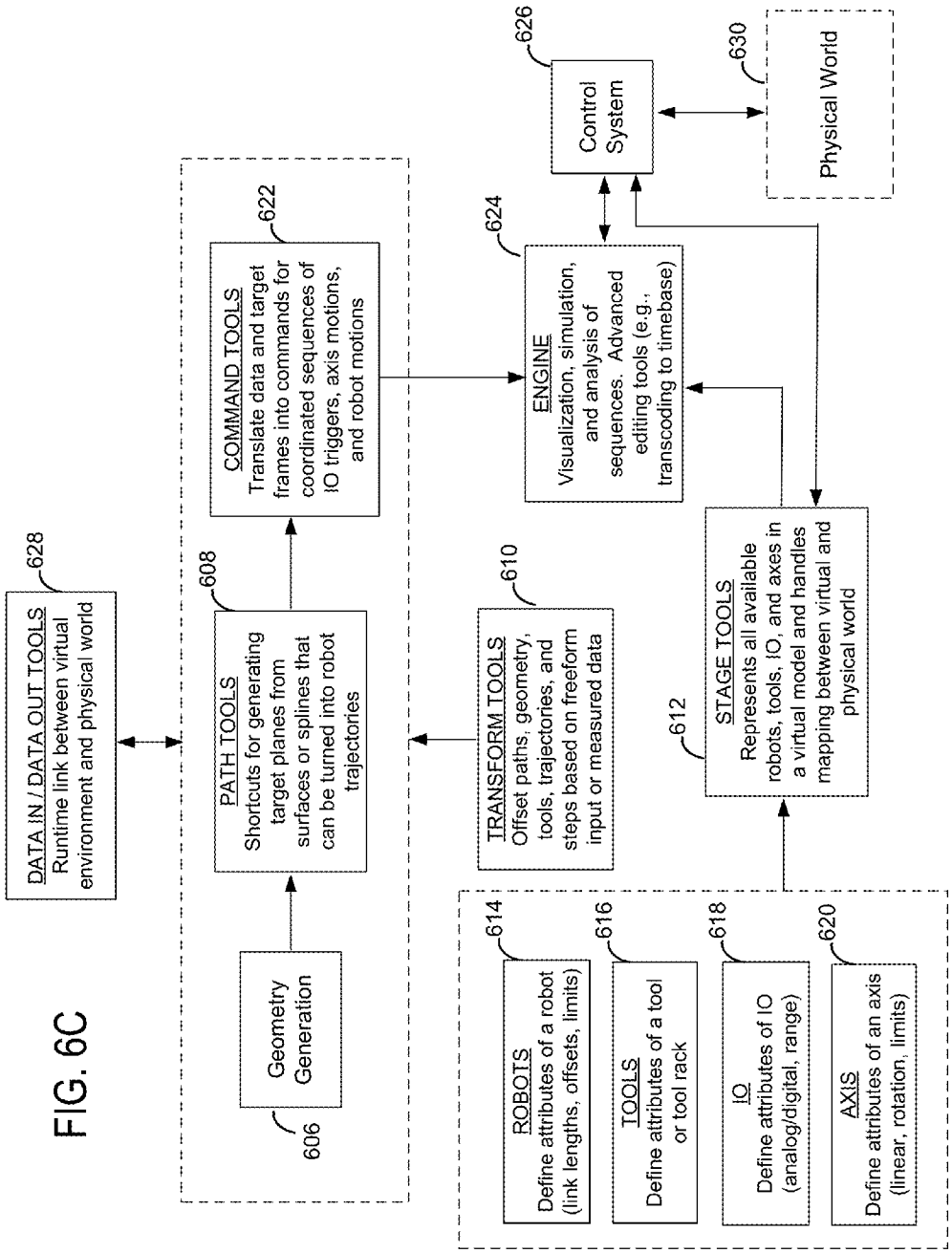
FIG. 6C is a block diagram of an example workflow, according to an example embodiment.

FIG. 6B shows an organization of digital tools within a toolbar, according to an example embodiment. As shown, the digital tools may be divided into a number of different categories. The digital tools may then be used in combination to design a building process, as shown by FIG. 6C. FIG. 6C is a block diagram of an example workflow, according to an example embodiment. In particular, FIG. 6C shows workflow involving a number of digital tools, which may be accessible within a toolbar as depicted in FIG. 6A and FIG. 6B or by another means within a graphical interface. As shown, the digital tools may be divided into a number of different categories. One or more digital tools from a number of different categories may be selected by a user to affect particular aspects of the building process, including the robot actors and other components within a physical workcell that may be used in the process.

In one example, a toolbar may include path tools 608 relating to generating target planes that may be used to determine motion paths of robot actors. In some examples, the path tools 608 may take as input geometry 606 describing a desired output product, such as geometry generated by parametric modeling software, Grasshopper. For instance, the output product geometry 606 may be generated based on user input within an input window specifying aspects of the output geometry, including dimensions, density, curvature, materials, and so on. The path tools 608 may then determine target planes for robot motion paths based on the output product geometry 606.

In some examples, the output product geometry 606 may include particular splines, surfaces, and/or other geometrical constructions to be included within an output product. The path tools 608 may then provide shortcuts for generating target planes relating to aspects of the output product in a format that can be turned into particular robot trajectories that may be used to construct an output product containing the target planes. Motion paths for individual robot actors may then be derived as a function of the target planes in addition to tool definitions and material properties, for example.

In further examples, a toolbar may include transform tools 610 relating to transformations between different axis frames or offsets, as shown by FIG. 6B and FIG. 6C. For instance, the transform tools 610 may provide transformations between coordinate frames at the base or joints of a particular robot and a stage containing the output product. In other examples, the transform tools 610 may additionally allow for transformations between multiple robots operating within different frames of reference as well. As shown in FIG. 6C, transformations may be applied before and/or after determining sequences of motion for individual robot actors.

In further examples, a toolbar may include stage tools 612 that represent aspects of a physical workcell, such as robot actors, tools, IO, and/or axes. In some examples, stage tools 612 may also provide a mapping between virtual robots in software and physical robot actors within the physical workcell, as shown by FIG. 6B and FIG. 6C. The stage tools 612 may be used by engine node 624 to send trajectories for robot actors to take based on output from command tools 622 to a control system 628. In some examples, stage node 612 may be configured in order to specify the currently available robotic devices and/or tools within a particular physical workcell. The control system 626 may then command robot actors and/or other components within the physical world 630 based on information from stage tools 612.

In some examples, stage tools 612 may take input from one or more robot nodes 614 representing attributes of individual robot actors within a physical workcell, as shown by FIG. 6B and FIG. 6C. A robot node 614 may be used to define attributes of a robot actor, such as traditional six-axis robots or other types of robots. The robot attributes may include link lengths of the robot and/or arm lengths of the robot, offsets of the robot and/or joints of the robot, and/or limits on robot joint movement or maximum torque that a robot joint can handle, for example.

In additional examples, stage tools 612 may also take input from one or more tool nodes 616 for defining the attributes of physical building tools and/or a tool rack for holding the tools, as shown by FIG. 6B and FIG. 6C. For example, attributes of building tools such as grippers or spindles may be specified by tool nodes, which may be used to configure an automatic tool changer so that robot actors can easily switch between tools. In some examples, robot actors may switch between tools using a tool rack which stores the tools and facilitates a tool changing process, as described above with respect to FIGS. 3A and 3B.

In further examples, the tool nodes 616 may include support for compound tooling that may allow component tools to be assembled into compound tools. In particular, individual tooling parameters (e.g., wrist mount offsets or tool center points) may be abstracted into components that may be assembled into compound tools. For instance, multiple tools may be aggregated into one compound tool that has multiple tool orientations and/or center points that may be used depending on which component of the tool may be required at a particular time. For example, a compound tool with an automatic tool changer may be represented by a master interface plus a number of different attachments, such as a spindle, a vacuum array, or a gripper. In another example, a compound tool may include a series of different tools, such as a gripper plus a tensioner plus a roller. Other examples of combining multiple tools and/or combining tools by abstracting tooling into parameters that define tool orientation and/or center points are also possible.

In further examples, stage tools 612 may also take input from one or more IO nodes 618. The IO nodes 618 may describe information relating to digital and/or analog input and/or output actions that may be taken by a robot actor, such as the type of action (e.g., gripping a material) and attributes associated with the action (e.g., width of material that can be gripped). In additional examples, the robot attributes may include one or more axis nodes 620. The axis nodes 620 may describe one or more linear and/or rotational axes along which a robot can travel, including limitations on the robot's movements along the axes.

In additional examples, a toolbar may include command tools 622, as shown by FIG. 6B and 6C. The command tools 622 may be used to determine robot commands to cause one or more of the robot actors to execute particular operations, which may include point-to-point motions, motions along external axes, and/or input or output events. For example, one of command tools 622 may be used to direct a particular robot motion along one of six degrees of freedom, a particular robot motion along an external axis, or a particular input or output event, such as applying glue to a material in a particular manner. Additionally, command tools 622 may be included for creating step nodes that instruct robot actors to take a particular sequence motion steps and carry out one or more tool actions. In further examples, coordinated sequences of motions may be generated for multiple robot actors working together within a single timeframe.

In some examples, step nodes, or sequences of motions and actions, can be abstracted into reusable subroutines. For instance, a subroutine can be defined by connecting visual building blocks, which may represent particular motion commands or motion parameters. The subroutine could then be used to make one or more robots carry out the same action sequence multiple times within a single building process. In some examples, steps can be synchronized across multiple robots so that multiple robots can work in a shared environment simultaneously. Example systems may also include an engine node 624, which may assign each of the steps to particular robotic devices within a stage.

In further examples, users may be provided with functionality to switch between steps within the graphical interface. For instance, timeline 508 as illustrated and described with respect to FIG. 5 may also includes buttons to skip between steps on the timeline. In some examples, digital bookmarks may be inserted by a user for particular steps. For instance, through the graphical interface, it may be possible to jump from the beginning of a "fetch stick" step to the beginning of a "nail stick" step. These bookmarks steps within the timeline may match the steps authored by the user by inputting motion commands, IO commands, and/or other commands in a step node.

Additionally, the engine node 624 may communicate with control system 626. The control system 626 may be a computing device capable of communicating wirelessly with robot actors and/or other components such as sensors within the physical workcell in the physical world 630. In particular, the control system 626 may provide access to real time data streams from all robot actors and devices, which may allow for precise control over the physical workcell at particular points in time. The control system could communicate with some or all of the actors or devices through wired connections or other types of communication channels as well or instead, including previously described network protocols.

In some examples, the control system may additionally contain a physical control interface such as a touchscreen interface that may allow a user to interact with the control system to view live data or modify robot actions in real time. For instance, a stage file containing information about the physical workcell including actors, tools, materials, and environmental setup on the control system 626 may be accessible via a programming interface. A user who is watching a building process within the physical world 630 may then make modifications to the process before it is completed.

In additional examples, a toolbar may include data IO tools 628 that may allow the control system 626 to send and/or receive data to and/or from the virtual software environment that determines robot motion paths, as shown by FIG. 6B and FIG. 6C. Accordingly, telemetry from the control system 626 may be used to create a live link between the virtual world in software and the physical world 630. For instance, the data input/output tools 628 may be used to process information from the control system 626 relating to the robot actors within the physical workcell and/or other components in the workcell such as sensors. Based on this information about the physical world 630, the virtual robots within software may be updated with real-time feedback from the physical world 630 (e.g., motion paths for robot actors may be determined or modified based on real-time sensor data).

Additionally, the data input/output tools 628 may be used to send data back to the control system 626 so that the control system 626 can effectuate particular input or output actions within the physical world 630, for example. For instance, the control system 626 may instruct a robot actor how use a tool in the physical world 630 (e.g., how to control a spindle) based on information from one or more digital tools within the software interface.

In further examples, engine node 624 include visualizer or simulation tools that may allow a user to simulate a building process through a user interface in software, as shown by FIG. 6B and FIG. 6C. In some examples, the visualizer tools may display the building process as geometry drawn on a screen that shows the physical workcell. In other examples, the visualizer tools may display the building process as curves representing particular data values as well or instead. Additionally, in further examples, the visualizer tools may also be used to visualize a building process in software as it is actually occurring within the physical world 630. In some examples, the visualizer tools may additionally provide a graphical representation of potential conflicts within a particular building process, such as when a robot's motion path extends outside its possible range of motion or when two robot actors may be going to collide based on the currently defined trajectories and/or step sequences.

In further examples, the visualizer component may allow a user to see simulations of the building process in advance and/or as the building takes place. In some examples, the user may use the visualizer component offline to see robotic motion paths as well as input/output events over a series of sequential steps as geometry drawn within a viewing window. In other examples, the user may be able to visualize a simulated playback as numerical data streams relating to the robot actors, materials, and/or other aspects of the physical workcell represented through curves in addition to or instead of visual geometry. In further examples, the user may also be able to see particular data points at individual timesteps, such as robotic joint values, axis values, or input/output values.

In some example systems, a user may also be able to use the visualizer component to visualize a building process that is occurring in the physical world in real time. The system may interface with a control system that receives real-time data streams from sensors that may be used to scan the physical workcell, individual robot actors, and/or parts used in construction as an output product is being built. Accordingly, the visualizer's user interfaces may be updated in real time to reflect real world dimensions, properties, and/or positions of objects and actors within the environment.

VI. Example Methods

A method 700 is provided for instructing robotic devices that may allow for real-time adjustment of robotic operation within a workcell, according to an example embodiment. In some examples, method 700 may be carried out by a control system, such as manufacture control system 100, master control 10, and/or software control 26 as described in reference to FIG. 1. The control system may communicate with the robot actors using any of the network protocols or communication methods previously described. In additional examples, part or all of method 700 may be executed by any of the graphical interfaces or systems described and illustrated with respect to FIGS. 4A-4B, 5, and 6A-6C. In further examples, part or all of method 700 may be carried out by one or more robotic devices, such as device actors 42, 44 within system devices 40 as described in reference to FIG. 1, or device actor 200 as illustrated and described in reference to FIGS. 2A-2C. Additionally, while examples with certain numbers and types of system devices may be described, various alternative embodiments may include any number and type of robotic devices as well.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 7. Where used, program code can be stored on any type of computer-readable medium, for example, such as a storage device including a disk or hard drive.

Figure 7:
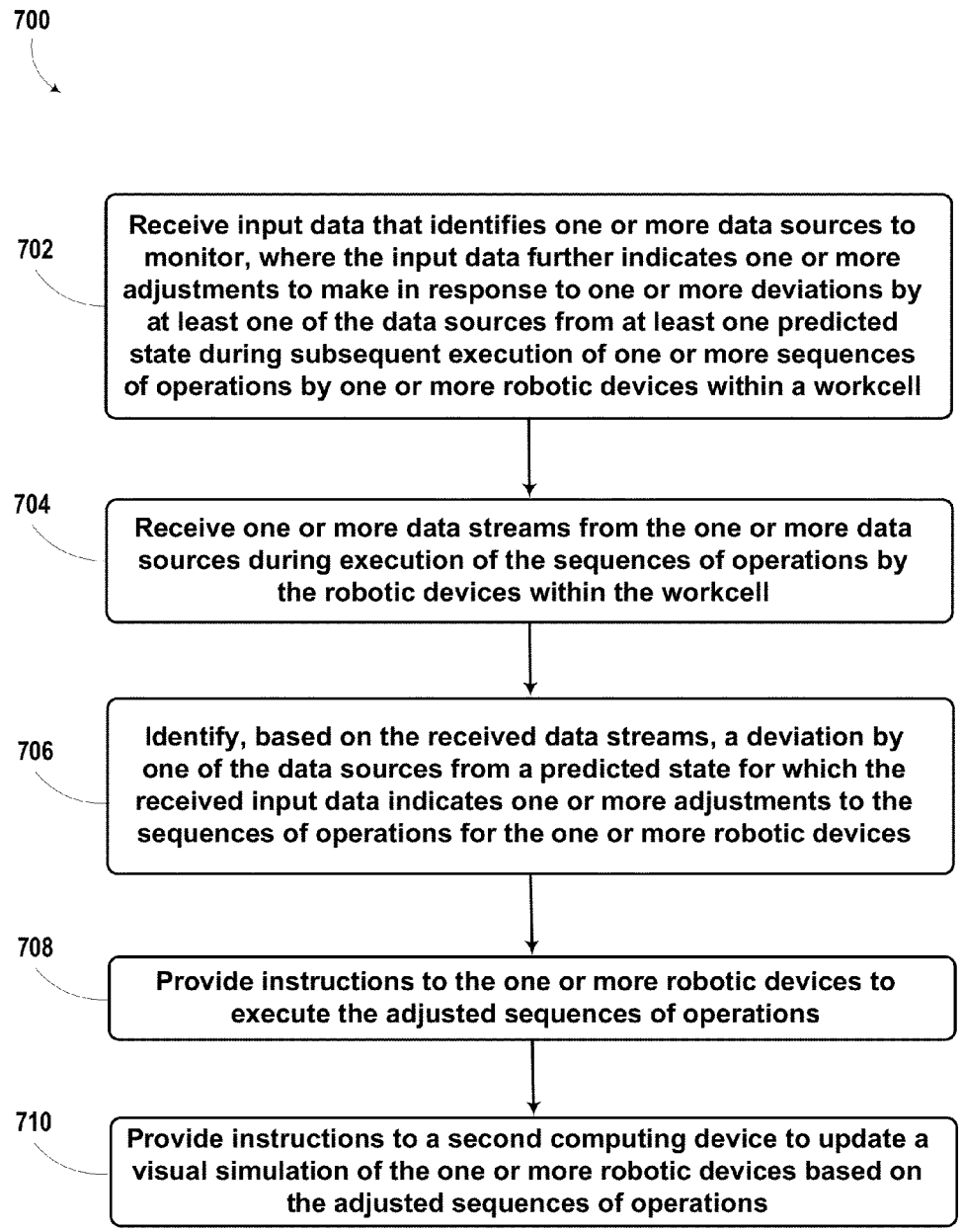
FIG. 7 is a block diagram of an example method, according to an example embodiment.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702 of FIG. 7, method 700 may include receiving input data. In some examples, steps of method 700 may be performed by a first computing device or control system, which may receive the input data from a second computing device. In further examples, the second computing device may be configured to display a user interface or graphical interface such as those described and illustrated with respect to FIGS. 4A-4B, 5, and 6A-6C. Additionally, the second computing device may be configured to display a visual simulation of one or more robotic devices executing sequences of operations within a workcell. In some examples, part or all of the visual simulation may be displayed within a user interface of the second computing device before any robotic devices perform operations within the workcell. In further examples, part or all of the visual simulation may be played back during execution to reflect actual robot operation within the workcell.

Within examples, the visual simulation may contain a graphical representation of robotic devices performing movements and/or other robot operations over a series of steps or at particular timestamps of a global timeline. In further examples, the visual simulation may contain representations of additional components within the workcell as well, depending on the particular process assigned to the robotic devices. For instance, if a group of robots are programmed to construct a particular output product within the workcell (e.g., a part of a building or a vehicle), the visual simulation may additionally contain a representation of the output product over the series of steps or timestamps as well or instead.

Figure 8A:
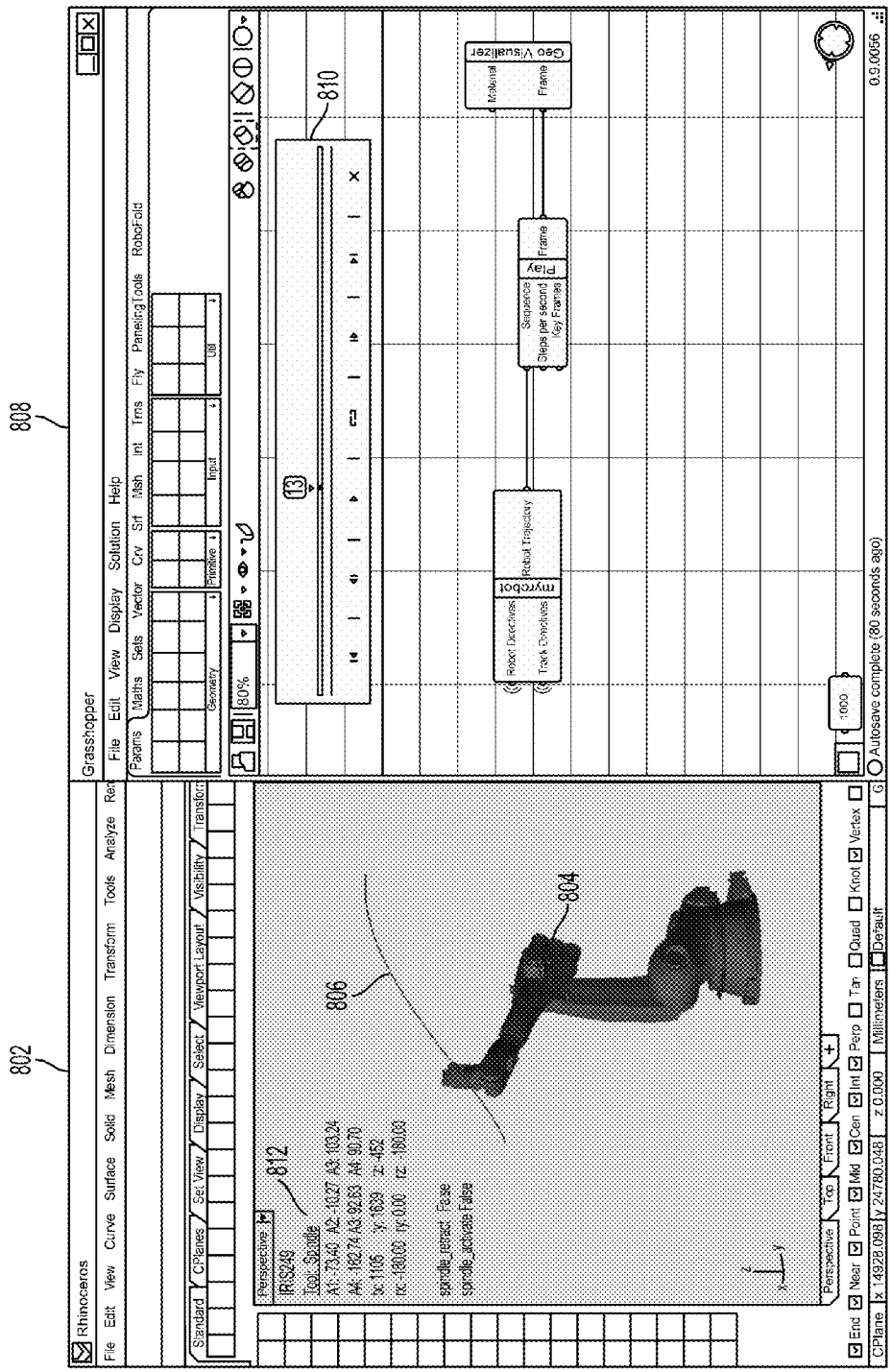
FIG. 8A shows a visual simulation of robotic operation, according to an example embodiment.

FIG. 8A shows a visual simulation of robotic operation, according to an example embodiment. More specifically, a user interface of a computing device may contain a display window 802 that illustrates a robotic device 804 moving along a motion path 806 and/or executing robot operations, such as operations using an end-effector-mounted tool. In some examples, the display window 802 may be display window 408 as described and illustrated with respect to FIG. 4A-4B and/or display window 510 as described and illustrated with respect to FIG. 5. The user interface may additionally contain an input window 808, which may be input window 402 as described and illustrated with respect to FIG. 4A-4B and/or input window 502 as described and illustrated with respect to FIG. 5.

In further examples, the input window 808 may contain a timeline 810 which reflects the current step number or timestamp within a sequence of robot operations. The visual simulation may represent the state of the workcell at different points along timeline 810. In additional examples, the visual simulation may contain a heads-up display (HUD) window 812, which may be overlaid on top of a portion of the visual simulation. In further examples, the HUD 812 may contain information about the state or position of robot actors, tools, and/or IO devices at particular points along timeline 810. For instance, HUD 812 may contain axis values of robot 804, cartesian position values of an end effector of robot 804, and/or current states of one or more tools or IO devices associated with robot 804.

Figure 8B:
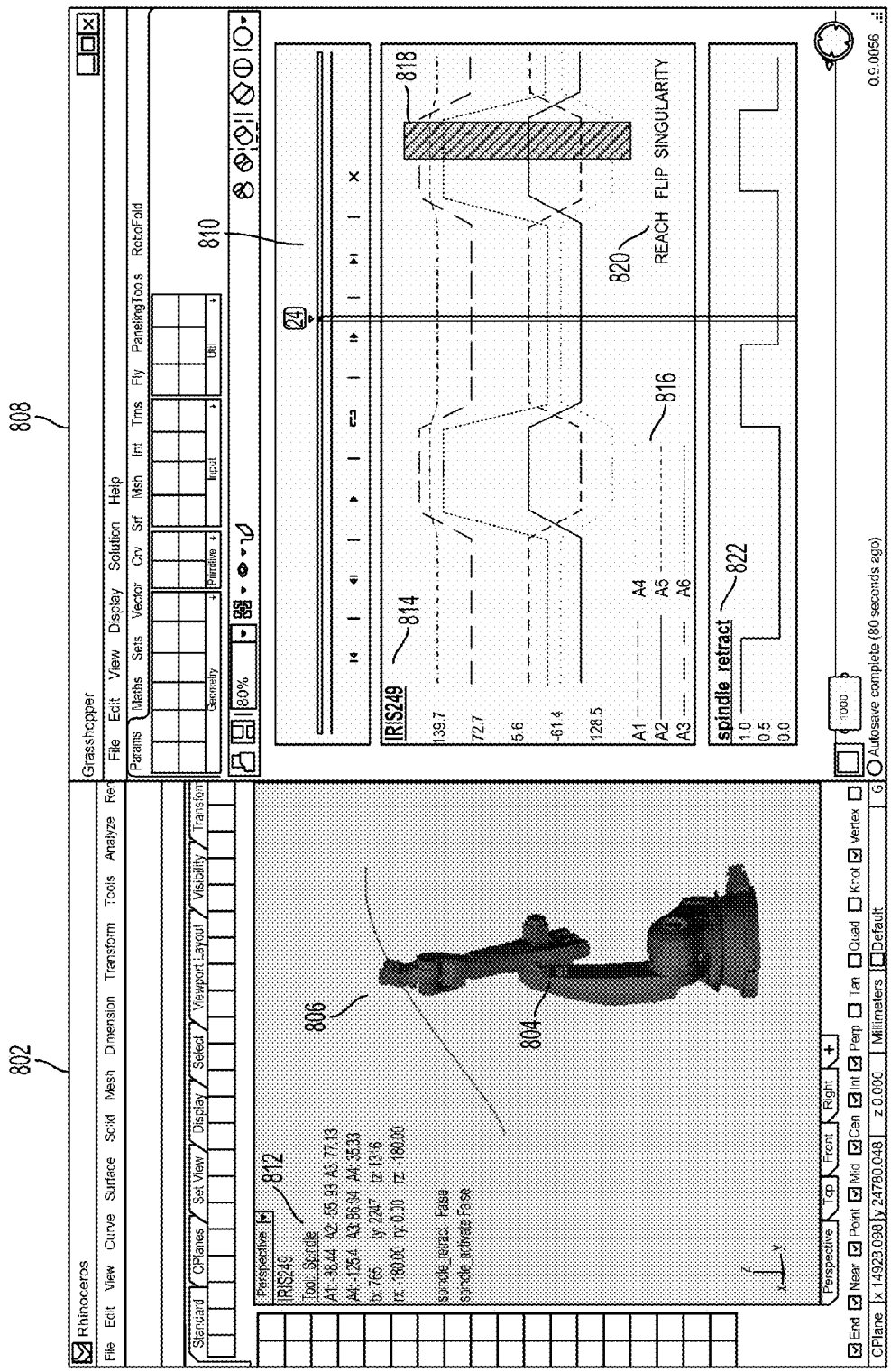
FIG. 8B shows a further view of the visual simulation from FIG. 7A, according to an example embodiment.

FIG. 8B shows another point along timeline 810 that occurs at a later point during a programmed sequence of operations for the robotic device 804. In FIG. 8B, display window 802 illustrates the movement of robotic device 804 along motion path 806. Different levels of granularity between steps or timesteps may be used for the visual simulation within different examples as well. In further examples, numerical parameters such as those contained within HUD 812 may be represented as visual curves over steps or time instead or as well. For example, one curve may show a particular joint parameter of a robotic device over time, a second curve may show a particular IO value associated with the robotic device over time, and so on.

FIG. 8B contains a visual curve representation 814 of the axis values 816 of robot actor 804 at points along timeline 810. FIG. 8B also shows a visual curve representation 822 of IO values for a particular IO device used by robot actor 804 to retract an end-effector-mounted spindle at points along timeline 810. Visual curve representations of different types of values and/or values for different types of components could be shown as well or instead. In further examples, a user may be able to configure which values are shown within one or more visual curves.

In additional examples, the visual simulation may contain warning signals indicating possible errors or conflicts resulting from robotic operation. In some examples, the warning signals may reflect potential problems with programmed sequences of motion and operation before the instructions are transmitted to robots within the workcell for execution. In other examples, the warning signals may reflect problems arising during operation as well or instead. For example, unexpected outcomes of programmed robot actions may trigger warning signals within the visual simulation. In further examples, warning signals may take a number of different forms and may represent a number of different types of potential errors or problems within robotic operation.

Referring to FIG. 8B, section 818 of visual curve window 814 may indicate a point at which one or more possible errors or conflicts in robot operation of robot actor 804 may occur. In some examples, particular types of errors may be displayed to a user within the visual curve representation as well. For instance, three possible errors 820 (reach, flip, singularity) are shown within visual curve window 814. Other types of errors or warnings within visual curve representations may be included as well or instead.

Figure 8C:
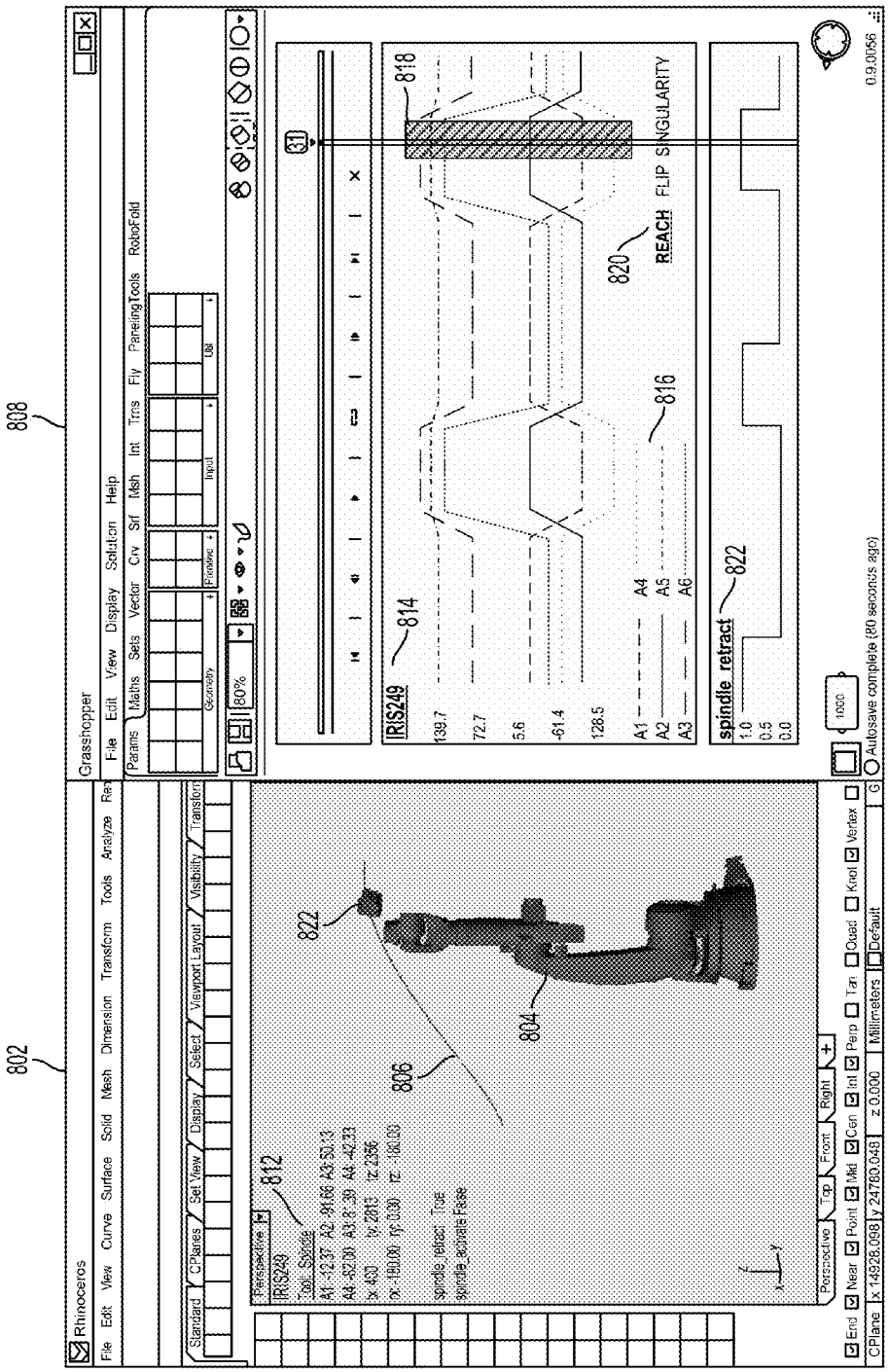
FIG. 8C shows another view of the visual simulation from FIG. 7A, according to an example embodiment.

FIG. 8C shows a further view of the visual simulation, according to an example embodiment. More specifically, a warning signal is triggered indicating that robot actor 804 cannot continue along motion path 806, for example, when a target plane for the end effector of the robotic device 804 is outside the range of motion for the robotic device 804. This type of error could result from a programmed sequence of operations for the robot containing unreachable targets and/or from unexpected occurrences during robot operation within the workcell. In one example, the warning signal may be indicated by the robotic device 804 stopping movement along motion path 806, while a tool 812 that was mounted on an end effector of the robotic device 804 continues along motion path 806. In further examples, the warning signal may be represented by changing the color of the robotic device 804 within the visual simulation to a different color (e.g., red). In some examples, the color of the timeline 810 could be changed as well or instead.

In additional examples, the warning signal may be indicated within one or more visual curve representations as well or instead. For instance, visual curve window 814 may indicate a warning signal as a colored or shaded section 818, and may further indicate the type of error or warning by indicating a selection from a list of possible errors 820. For example, reach may be highlighted, changed to red, or otherwise selected to indicate an error in that robot actor 804 cannot reach a particular programmed target location. In additional examples, a curve or numerical parameter may change color (e.g., to red) when it approaches or reaches a predefined constraint or user-defined constraint for the robotic device. In further examples, separate warning signals may be shown both within a geometric representation of robotic operation and within a HUD or other type of visual representation as well.

In further examples, warning signals may be triggered within the visual simulation for other types of errors as well or instead. In some examples, possible collisions between robotic devices and/or other components within a workcell may trigger warning signals. In additional examples, errors related to individual robot motion paths such as singularities or joint flips may also trigger warning signals. In yet further examples, a warning signal may be triggered when the motion path taken by a robotic device within the workcell deviates from a pre-programmed motion path for the robotic device (e.g., by more than a threshold amount or error tolerance). In cases where the visual simulation includes other types of components besides robotic devices, warning signals may also be triggered related to those components as well. For instance, in the case of a construction process, warning signals may be triggered relating to errors in an output product under construction, deviations of the constructed output product from planned specifications, and so on.

In additional examples, the visual simulation may contain other information relating to robotic operation in addition to or instead of a geometric representation. In some examples, a user interface may include a display window showing parameters of robotic operation at particular steps or timestamps of a robotic process. In further examples, the display window may be a HUD overlaid on a portion of the visual simulation (as shown in FIGS. 8A-8C) or otherwise presented within the display window so that a user may monitor data within the HUD while watching the visual simulation and/or interacting with other aspects of the software environment. In some examples, the HUD may reflect predicted information within a simulation before actual robotic execution within the workcell. In additional examples, the HUD may show actual parameters during robotic operation within the workcell as well or instead.

Figure 8D:
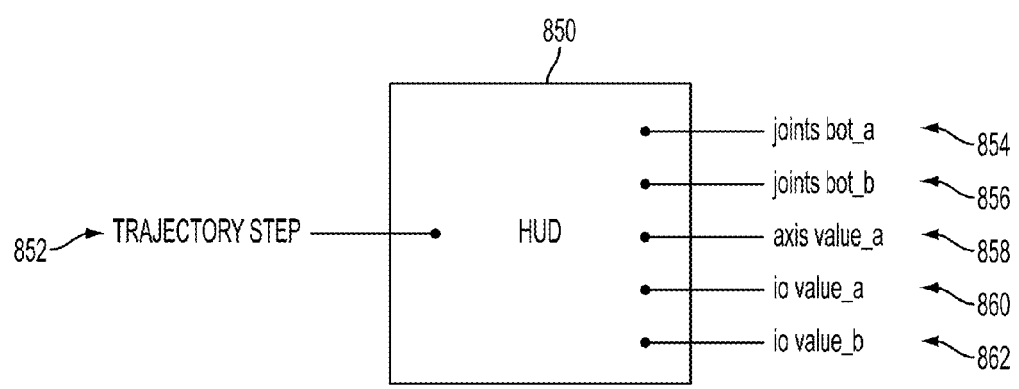
FIG. 8D shows a block diagram of an example heads-up display window, according to an example embodiment.

FIG. 8D shows an example block diagram of of a HUD, according to example embodiment. More specifically, a HUD 850 may show the current trajectory step 852, indicating where one or more robotic devices are along respective motion paths. Additionally, joint parameters 854 and 856 may represent current joint parameters (e.g., joint angles, velocities, or accelerations) of different robotic devices at the current trajectory step 852. Also, axis value 858 may represent the current axis position for a robotic device capable of moving along an axis of motion within the workcell. Additionally, IO values 860 and 862 may represent current digital or analog IO values associated with tools operated by robotic devices within the workcell. For example, an IO value may be a digital value indicating whether a robot's grippers is currently closed, or an analog value indicating the current amount of power used to drive a robot's spindle. Other parameters may be included within HUD 850 in some examples as well.

In further examples, numerical parameters such as those contained within HUD 850 may be represented as visual curves over steps or time instead or as well. For example, one curve may show a particular joint parameter of a robotic device over time, a second curve may show a particular IO value associated with the robotic device over time, and so on. In some examples, warning signals may be shown within the visual curves, numerical parameters, and/or HUD window as well. For instance, a curve or numerical parameter may change color (e.g., to red) when it approaches or reaches a predefined constraint or user-defined constraint for the robotic device. In further examples, separate warning signals may be shown both within a geometric representation of robotic operation and within a HUD or other type of visual representation as well.

Referring back to FIG. 7, method 700 may involve receiving input data from a second computing device configured to display a visual simulation of robots executing sequences of operations, such as illustrated and described with respect to FIG. 8A-8D. The input data may indicate one or more adjustments to make to the sequences of operations for one or more of the robotic devices to respond to unexpected occurrences within the workcell during robotic operation. More specifically, the input data may indicate adjustments for the robots to respond to a deviation by one or more data sources from a predicted state during subsequent execution of the sequences of operations. The data sources may include the robotic devices as well as other components within the workcell.

Figure 9A:
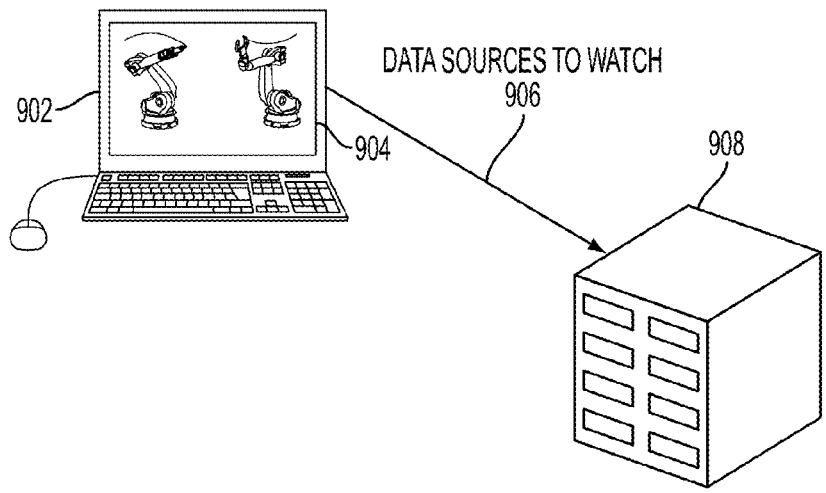
FIG. 9A illustrates a computing device displaying a visual simulation of robotic operation and a control system, according to an example embodiment.

FIG. 9A illustrates a computing device displaying a visual simulation of robotic operation and a control system, according to an example embodiment. More specifically, a computing device 902 may include a user interface showing a visual simulation 904 of robotic operation. The computing device 902 may send information indicating which data sources to watch 906 to a control system 908. Additionally, the information may indicate how the control system 908 should respond to deviations in expected state by the identified data sources. The control system 908 may be a timing computer, such as master control 10 described with respect to FIG. 1.

In further examples, the data sources to watch 906 and corresponding instructions regarding how to respond to deviations by the data sources may be configured through a user interface of computing device 902. For instance, this information may be input through any of the software interfaces previously described. In some examples, the data sources to watch and corresponding instructions may be specified before any robotic operation within the workcell. In other examples, some or all of this information may be specified after robotic operation has commenced.

In some examples, the data sources to watch may include one or more of the robotic devices. For instance, control system 908 may receive information from the robotic devices such as position information, joint parameters, position information associated with an axis of motion for a robotic device, parameters associated with operation of an end-effector-mounted tool, and/or diagnostic information related to systems on a robotic device. In further examples, computing device 902 may identify which data streams from the robotic devices for control system 908 to watch as well as how to respond to deviations within the data streams.

For instance, a user of computing device 902 may specify that control system 908 should watch joint parameters of a particular robotic device to ensure that the robotic device doesn't violate a constraint of motion. The user may also specify how the control system 908 should respond when the robot approaches or violates the constraint. For example, control system 908 may be given instruction to slow down the robot or stop the robot in such a circumstance.

In another example, a user of computing device 902 may specify that control system 908 should watch the motion path of a particular robotic device to ensure that it doesn't deviate from a programmed motion path (e.g., programmed from a graphical interface of computing device 902). If the motion path does deviate by more than a threshold amount, instructions may be provided for how control system 908 should respond. For example, control system 908 may be instructed to adjust the motion path of the robotic device on the fly to coincide with the pre-programmed motion path, or to control the robotic device to hold position until a human user can intervene.

In further examples, the data sources may include one or more sensors positioned inside or around the workcell and/or mounted on robotic devices or other components within the workcell. For instance, possible sensors may include position sensors, temperature sensors, pressure sensors, laser-based sensors, infrared sensors, and/or computer vision-based sensors. Many other types of sensors are also possible.

In some examples, one or more sensors may detect data related to a state of the workcell or the physical environment. For instance, a temperature sensor may be used to measure the temperature of the workcell. A user may specify particular robot actions for environments where the temperature drops below or rises above a threshold level. For instance, a robotic device may be assigned to apply a particular gluing material during a manufacturing process that only functions properly within a certain temperature range. In such a circumstance, if the temperature of the workcell falls outside the specified range, the user may instruct the control system to cause the robotic devices to hold position until the temperature comes back within the specified temperature range, possibly repeat operations which may have failed because of the temperature of the workcell, and so on.

In other examples, one or more sensors may be mounted on or otherwise connected to robotic devices as well, such as a pressure or force sensor to measure the pressure applied by an end-effector-mounted tool of a robotic device. In such an example, a user may specify the maximum pressure or force that can be applied to a particular material (e.g., a material used in construction) as well as how to respond when the maximum pressure or force is reached. For instance, the control system could be instructed to responsively cause the robotic device to reduce pressure or stop operation (e.g., to avoid damaging the material).

In further examples, one or more sensors may be configured to detect information about a particular component within the workcell. For example, for a workcell in which robotic devices are assigned to execute a manufacturing process, one or more sensors may be used to detect information about an output product under construction. For instance, the sensor data may indicate whether a particular surface being constructed is level as intended. If not, instructions may be provided to the control system regarding how to adjust robotic operation on the fly. For example, in some cases, small changes in robot movements or operations may be employed by the control system to correct the error in construction. In other examples, it may instead be necessary to halt robotic operation. Other adjustments are also possible.

In further examples, the data sources may include other sources capable of providing data streams relevant to robotic operation as well, possibly including data streams from a third party application, an internet source, or a separate user input device. For instance, one or more sensors or data sources may be connected to control system 908 via a remote, cloud-based server system. In such examples, robot trajectories or other aspects of robotic operation may be altered based on data coming in from one or more remote locations in addition or instead of from data sources within the workcell. As part of a cloud-based implementation, the data sources may communicate with the server through a wireless connection, through a wired connection, or through a network of wireless and/or wired connections. The server may likewise communicate with the control system through a wireless connection, through a wired connection, or through a network of wireless and/or wired connections.

In additional examples, a cloud-based remote server may help reduce the control system's processing load. In such embodiments, the cloud-based server system may function to collect data from multiple sources, filter the data as needed, and then distribute relevant data to the control system. In some examples, a remote server system may perform some or all of the necessary data processing (e.g., determining when a condition has been met that indicates an adjustment to robot operation) in order to reduce the load on the control system before transmitting data and/or instructions to the control system for use in operation.

Method 700 may additionally involve receiving one or more data streams from the one or more data sources, as shown by block 704. The data streams may be received during execution of the sequences of operations by the robotic devices within the workcell. In some examples, the data streams may be received continuously, or at a particular time interval such as every 10 milliseconds, every 100 milliseconds, or every second. In additional examples, different time intervals may be used for receiving information from different devices or components within the workcell. In further examples, data streams may be received from one or more of the data sources sporadically or at irregular intervals. For instance, data may only be received from certain sources when aspects of the workcell and/or robotic devices operating within the workcell change state. In other examples, data may only be received from devices or sensors that are relevant to a particular portion of a robotic process currently being executed.

Figure 9B:
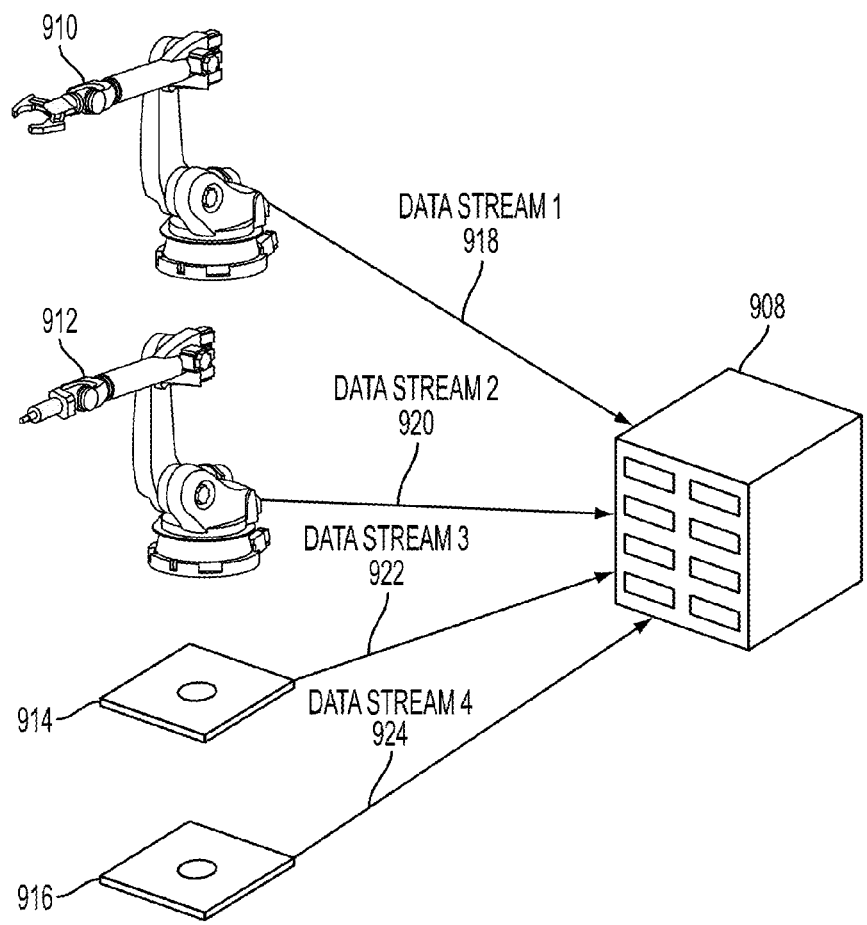
FIG. 9B illustrates the control system from FIG. 9A receiving data streams from components within a workcell, according to an example embodiment.

FIG. 9B illustrates the control system from FIG. 9A receiving data streams from components within a workcell, according to an example embodiment. More specifically, control system 908 may receive a first data stream 918 from a first robotic device 910 operating within a workcell, a second data stream 920 from a second robotic device 912 operating within the workcell, a third data stream 922 from a first sensor 914, and a fourth data stream 924 from a second sensor 916. Each data stream may be received at a different rate or interval, and other combinations of components and data streams are also possible. In further examples, multiple data streams may be received from a single source and/or a single data stream may contain multiple types of information. For example, the data received from the first robotic device 910 may include data indicating the current position of the device, data indicating one or more joint parameters of the device, data indicating a state of operation of an end-effector-mounted tool on the device, and so on.

Method 700 may additionally include identifying a deviation by one or more of the data sources from a predicted state, as shown by block 706. More specifically, a control system may monitor the data streams received from devices or components within the workcell to watch for deviations for which the received input data indicates adjustments to the sequences of operations for the robotic devices. In some examples, a deviation may relate to the predicted state of a single component within the workcell (e.g., when the temperature detected by a temperature sensor crosses a threshold or when the position of a robotic device deviates from a programmed motion path by a certain amount). In other examples, a deviation may relate to the predicted state of multiple components in combination (e.g., data streams from multiple types of position sensors within the workcell may collectively indicate an unexpected circumstance requiring modification).

Figure 9C:
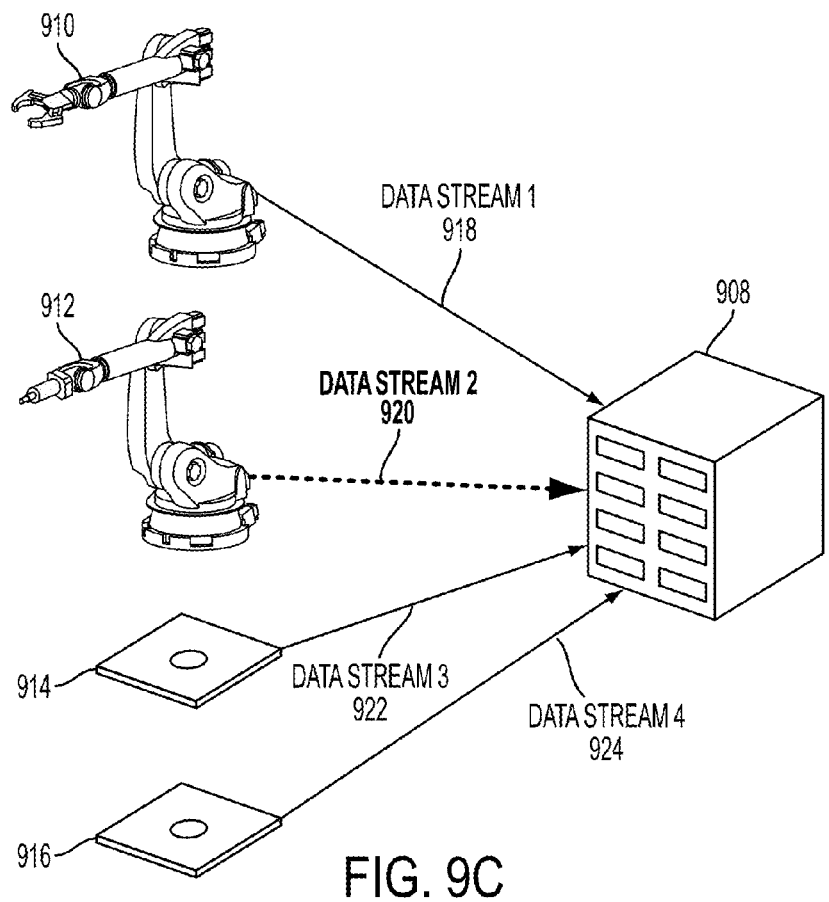
FIG. 9C illustrates the control system from FIG. 9A identifying a deviation by one of the data streams from FIG. 9B, according to an example embodiment.

FIG. 9C illustrates the control system from FIG. 9A identifying a deviation by one of the data streams from FIG. 9B, according to an example embodiment. More specifically, control system 908 may monitor the data within the first data stream 918, the second data stream 920, the third data stream 922, and the fourth data stream 924 as it is received. At some point during execution of a robotic process by robotic device 910 and robotic device 912, the data stream 920 may indicate deviation from an expected state requiring adjustment of the process. For example, the position of robotic device 912 may have deviated from a planned motion path, one of the joint parameters of robotic device 912 may be approaching a predefined constraint, or a sensor mounted on robotic device 912 may indicate that the device's spindle is about to damage a material in construction.

Method 700 may additionally include providing instructions to the one or more robotic devices to execute adjusted sequences of operations, as shown by block 708. More specifically, a control system may determine and transmit instructions to adjust robotic operation according to the input data received in block 702. The instructions could cause one or more of the robotic devices to change speed, hold position, repeat operations, reverse movements or operations, or to otherwise modify previously assigned sequences of movements or other robot operations. Additionally, the instructions could be provided to the robotic devices using any of networking or communication systems previously described.

Figure 9D:
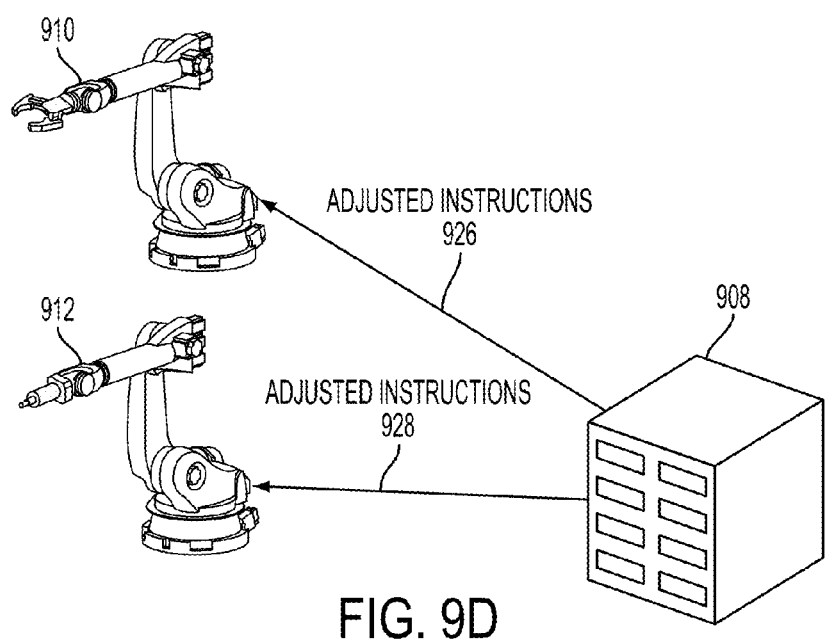
FIG. 9D illustrates the control system from FIG. 9A sending adjusted instructions to robotic devices, according to an example embodiment.

FIG. 9D illustrates the control system from FIG. 9A sending adjusted instructions to robotic devices, according to an example embodiment. More specifically, control system 908 may provide adjusted instructions 926 to robotic device 910 and adjusted instructions 928 to robotic device 912. In some instances, adjusted instructions may only be provided to a particular one or more of the robotic devices, depending on the adjustment necessary. For instance, only a single robot may require adjusted instructions to avoid violating a predefined constraint on the robot's available range of motion. In other examples, adjusted instructions may be provided to all of the robotic devices within a workcell. For instance, a temperature drop below a certain threshold may require all of the robotic devices to pause operation.

In further examples, the adjusted instructions may be provided to the robotic devices by control system 908 by pushing the instructions to individual robot controllers on the robotic devices. In some examples, control system 908 may be a timing computer that sends and/or receives data or instructions to and/or from devices and/or other components within a workcell at a certain time interval (e.g., every 10 milliseconds, 100 milliseconds, or 1 second). In such examples, the adjusted instructions 926 and 928 may be provided to robotic devices 910 and 912 at the end of the current time interval. By using a smaller time interval, more precise control of robotic operation may be obtained, possibly including handling occurrences requiring rapid adjustment.

Method 700 may additionally include providing instructions to a second computing device to update a visual simulation of the robotic devices, as shown by block 710.

More specifically, the adjusted sequences of robot operations may be used to backdrive a user interface of a second computing device in order to notify a user of any changes in operation. For instance, after adjusted instructions are provided to a particular robotic device to slow down its speed of operation, the visual simulation may reflect the reduced speed of the robot as well. In additional examples, updated state information for the robotic devices and/or other components within the workcell may be provided to the computing device as well. For instance, the visual simulation on the computing device may include a representation of an output product under construction. Adjustments may be made during robotic operation in an effort to keep a particular surface of the output product level, and the current state of the output product over time may be shown within the visual simulation. As another example, the visual simulation may include a curve representing sensor data from a particular sensor over time. When the data stream from the sensor changes, a control system may identify the change and provide the modified data stream to the computing device to update the visual simulation.

In further examples, other aspects of the visual simulation may be updated as well or instead. For instance, if the visual simulation contains a HUD as previously described, numerical values within the HUD may be updated based on received data streams from a control system as well. In some examples, warning signals may also be generated based on the received data as well. For example, one or more joint parameters of a robotic device may change after the control system adjusts operations of the device. The adjusted joint parameters may approach a predefined constraint for the robotic device. The HUD may then display the adjusted joint parameters as well as a warning signal (e.g., by displaying the potentially problematic parameters in red) to a user of the computing device.

Figure 9E:
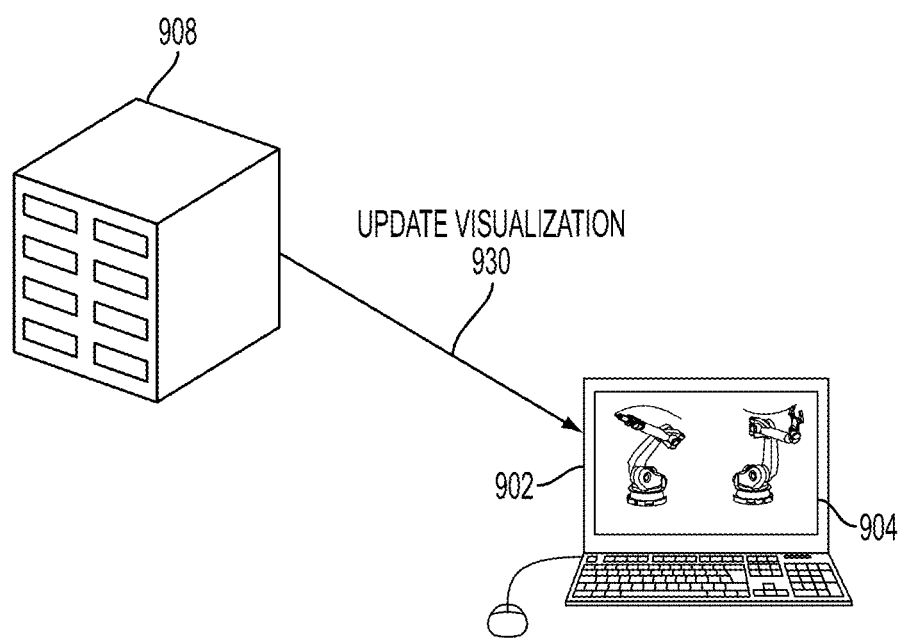
FIG. 9E illustrates the control system from FIG. 9A sending instructions to update the visual simulation on a computing device, according to an example embodiment.

FIG. 9E illustrates the control system from FIG. 9A sending instructions to update the visual simulation on a computing device, according to an example embodiment. More specifically, after adjusting operation of one or more robotic devices, control system 908 may provide information 930 to update the visual simulation 904 on computing device 902. For instance, any changes in operation for the robotic devices occurring during physical operation within the workcell may be shown within the visual simulation. In further examples, updated state information that does not require modification of robotic operation may be sent from control system 908 to computing device 902 as well. For instance, a particular unexpected state change of an output product under construction may not require any adjustment to robotic operation, but the information may still be transmitted to computing device 902 to update the visual simulation 904 accordingly. In further examples, the information 930 may be provided from control system 908 to computing device 902 continuously, at a certain time interval, or only when changes in robotic operation and/or component state within the workcell occur.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving, by a computing device, one or more sequences of operations corresponding to one or more robotic devices within a workcell, wherein the one or more sequences of operations are synchronized to timestamps of a global timeline;
   providing instructions for display of a visual simulation of the one or more robotic devices to illustrate a portion of the one or more sequences of operations;
   providing instructions for display of a graphical timeline representing timestamps of a portion of the global timeline corresponding to the portion of the one or more sequences of operations;
   identifying, by the computing device, an error in robotic operation predicted to occur during execution of the portion of the one or more sequences of operations, wherein the error comprises at least one of the one or more robotic devices exceeding an allowable range of motion;
   determining, by the computing device, a timestamp of the global timeline at which the error is predicted to occur;
   providing instructions for display of a warning signal indicating the error at a timestamp of the graphical timeline representing the timestamp of the global timeline at which the error is predicted to occur; and
   providing instructions for display, within the visual simulation, of an end effector separated from the at least one of the one or more robotic devices by a distance proportional to an extent by which the allowable range of motion is exceeded.

2. The method of claim 1, further comprising:
   after providing the instructions for display of the indication of the error, receiving input data indicating a selection of the timestamp of the graphical timeline representing the timestamp of the global timeline at which the error is predicted to occur; and
   in response to receiving the input data, providing instructions for display of an indication of a state of the one or more robotic devices at the timestamp of the global timeline at which the error is predicted to occur.

3. The method of claim 2, further comprising:
   receiving additional input data indicating at least one modification to the one or more sequences of operations; and
   updating the visual simulation, the global timeline, and the graphical timeline to illustrate the at least one modification indicated by the received input data.

4. The method of claim 1, further comprising:
   receiving input data indicating a selection of a particular timestamp of the graphical timeline; and
   providing instructions for display of a portion of the visual simulation starting at a timestamp of the global timeline corresponding to the particular timestamp of the graphical timeline.

5. The method of claim 1, further comprising providing instructions for display of at least one time-based graphical curve representing a state of at least one of the one or more robotic devices during the portion of the one or more sequences of operations.

6. The method of claim 5, wherein the time-based graphical curve is synchronized with the global timeline, the method further comprising providing instructions for display of the indication of the error at a section of the time-based graphical curve corresponding to the error.

7. The method of claim 5, wherein the state of the at least one of the one or more robotic devices is a joint angle value of at least one joint of the at least one of the one or more robotic devices.

8. The method of claim 5, wherein the state of the at least one of the one or more robotic devices is an axis value of at least one axis of the at least one of the one or more robotic devices.

9. The method of claim 1, wherein the one or more sequences of operations corresponding to the one or more robotic devices comprise robot movements and tool actions that cause the one or more robotic devices to construct an output product, and wherein the visual simulation comprises a geometric representation of the output product over the portion of the one or more sequences of operations.

10. The method of claim 1, wherein the visual simulation of the one or more robotic devices comprises a geometric representation of the one or more robotic devices over the portion of the one or more sequences of operations.

11. The method of claim 1, wherein the visual simulation of the one or more robotic devices comprises numerical data associated with at least one joint parameter of at least one of the one or more robotic devices at one or more timestamps of the portion of the global timeline corresponding to the portion of the one or more sequences of operations.

12. The method of claim 1, further comprising:
    identifying at least one other error in robotic operation predicted to occur during execution of the portion of the one or more sequences of operations, wherein the at least one other error in robotic operation is at least one of a potential collision of the one or more robotic devices, a singularity in at least one of the one or more robotic devices, an input-output value associated with at least one of the one or more robotic devices exceeding a predefined range by a threshold amount, and a deviation in a state of an output product from a planned specification of the output product.

13. A system comprising:
    one or more robotic devices; and
    a computing device configured to:
        receive one or more sequences of operations corresponding to the one or more robotic devices within a workcell, wherein the one or more sequences of operations are synchronized to timestamps of a global timeline;
        provide instructions for display of a visual simulation of the one or more robotic devices to illustrate a portion of the one or more sequences of operations;
        provide instructions for display of a graphical timeline representing timestamps of a portion of the global timeline corresponding to the portion of the one or more sequences of operations;
        identify an error in robotic operation experienced during execution of the portion of the one or more sequences of operations, wherein the error comprises at least one of the one or more robotic devices exceeding an allowable range of motion;
        determine a timestamp of the global timeline at which the error has been experienced;

provide instructions for display of a warning signal indicating the error at a timestamp of the graphical timeline representing the timestamp of the global timeline at which the error has been experienced; and provide instructions for display, within the visual simulation, of an end effector separated from the at least one of the one or more robotic devices by a distance proportional to an extent by which the allowable range of motion has been exceeded.

14. The system of claim 13, wherein the computing device is further configured to modify, in response to identifying the error in robotic operation, the portion of the one or more sequences of operations.

15. The system of claim 14, wherein the computing device is further configured to update the visual simulation, the global timeline, and the graphical timeline to illustrate the modification to the portion of the one or more sequences of operations.

16. The system of claim 13, wherein the computing device is further configured to provide instructions for display of at least one time-based graphical curve representing a state of at least one of the one or more robotic devices during the portion of the one or more sequences of operations.

17. The system of claim 16, wherein the time-based graphical curve is synchronized with the global timeline, and wherein the computing device is further configured to provide instructions for display of the indication of the error at a section of the time-based graphical curve corresponding to the error.

18. A non-transitory computer readable medium having stored therein instructions, that when executed by a computing system, cause the computing system to perform functions comprising:

receiving, by a computing device, one or more sequences of operations corresponding to one or more robotic devices within a workcell, wherein the one or more sequences of operations are synchronized to timestamps of a global timeline;

providing instructions for display of a visual simulation of the one or more robotic devices to illustrate a portion of the one or more sequences of operations;

providing instructions for display of a graphical timeline representing timestamps of a portion of the global timeline corresponding to the portion of the one or more sequences of operations;

identifying, by the computing device, an error in robotic operation predicted to occur during execution of the portion of the one or more sequences of operations, wherein the error comprises at least one of the one or more robotic devices exceeding an allowable range of motion;

determining, by the computing device, a timestamp of the global timeline at which the error is predicted to occur;

providing instructions for display of a warning signal indicating the error at a timestamp of the graphical timeline representing the timestamp of the global timeline at which the error is predicted to occur; and providing instructions for display, within the visual simulation, of an end effector separated from the at least one of the one or more robotic devices by a distance proportional to an extent by which the allowable range of motion is exceeded.

19. The non-transitory computer readable medium of claim 18, wherein the functions further comprise providing instructions for display of at least one time-based graphical curve representing a state of at least one of the one or more robotic devices during the portion of the one or more sequences of operations.

* * * * *